United States Patent
Zorh et al.

(10) Patent No.: US 10,549,496 B2
(45) Date of Patent: Feb. 4, 2020

(54) APPARATUS FOR MANUFACTURING MINERAL FIBER

(71) Applicants: Billion Sung Hoon Zorh, Gyeonggi-do (KR); Nam Sook Chough, Seoul (KR)

(72) Inventors: Billion Sung Hoon Zorh, Gyeonggi-do (KR); Nam Sook Chough, Seoul (KR)

( * ) Notice: Subject to any disclaimer, the term of this patent is extended or adjusted under 35 U.S.C. 154(b) by 598 days.

(21) Appl. No.: 15/165,018

(22) Filed: May 26, 2016

(65) Prior Publication Data

US 2016/0354989 A1 Dec. 8, 2016

(30) Foreign Application Priority Data

Jun. 8, 2015 (KR) .................. 10-2015-0080383
Jun. 8, 2015 (KR) .................. 10-2015-0080384
Jun. 8, 2015 (KR) .................. 10-2015-0080386

(51) Int. Cl.
*F27D 17/00* (2006.01)
*B30B 9/28* (2006.01)
*F27D 99/00* (2010.01)

(52) U.S. Cl.
CPC .............. *B30B 9/28* (2013.01); *F27D 17/004* (2013.01); *F27D 99/007* (2013.01)

(58) Field of Classification Search
CPC ................................ C03C 13/06; C03C 1/026
See application file for complete search history.

(56) References Cited

U.S. PATENT DOCUMENTS

| 4,365,984 A * | 12/1982 | Gee | C03B 5/005 65/376 |
| 5,046,144 A * | 9/1991 | Jensen | C03B 5/005 219/121.36 |
| 2015/0344800 A1 | 12/2015 | Son et al. | |

FOREIGN PATENT DOCUMENTS

| JP | 2000-111025 A | 4/2000 |
| JP | 2003-161424 A | 6/2003 |
| KR | 10 1091837 B1 | 12/2011 |
| KR | 10 1430230 B1 | 8/2014 |
| WO | WO2003002469 A1 * | 1/2003 |

OTHER PUBLICATIONS

Korean Office Action for Korean Application No. 10-2015-0080383 dated Jun. 30, 2016 (10 pages).
Korean Office Action for Korean Application No. 10-2015-0080384 dated Jun. 15, 2016 (7 pages).
Korean Office Action for Korean Application No. 10-2015-0080386 dated Jun. 15, 2016 (4 pages).

* cited by examiner

*Primary Examiner* — Ellen M McAvoy
*Assistant Examiner* — Ming Cheung Po
(74) *Attorney, Agent, or Firm* — Eversheds Sutherland (US) LLP

(57) ABSTRACT

Provided is a coal briquette manufacturing apparatus including a material storage configured to store a plurality of materials for manufacturing coal briquette; a material mixer configured to mix the plurality of materials discharged from the material storage; a coal briquette manufacturer configured to manufacture the coal briquette by press-forming the materials mixed in the material mixer; and a conveyor provided to the material storage, the material mixer or the coal briquette manufacturer, and configured to transport the plurality of materials or the coal briquette, wherein the plurality of materials includes coal ashes, dolomite, and limestone, and a weight of the coal ashes is 70 to 80% of an entire weight of the plurality of materials.

4 Claims, 12 Drawing Sheets

25400

25420

APPARATUS FOR MANUFACTURING MINERAL FIBER

BACKGROUND

1. Field of the Invention

Embodiments relate to a mineral fiber manufacturing. More particularly, embodiments relate to a coal briquette manufacturing apparatus and method capable of adjusting a melting temperature of coal briquette or viscosity of a molten metal in which the coal briquette is melted based on a mixture ratio of materials used for manufacturing the coal briquette, and a mineral fiber manufacturing apparatus including the coal briquette manufacturing apparatus. More particularly, embodiments relate to a furnace in which air supplied from a blower is heat-exchanged, through a heat exchanger, with exhaust gas discharged through an exhaust gas outlet of the furnace and the air supplied from the blower is supplied to the furnace as the combustion air for combusting cokes, and a mineral fiber manufacturing apparatus including the furnace. More particularly, embodiments relate to a re-combustion apparatus that may efficiently remove impurities within exhaust gas discharged from a furnace by re-combusting or perfectly combusting the exhaust gas and a mineral fiber manufacturing apparatus including the same.

2. Description of the Related Art

In general, a thermoelectric power plant refers to a facility that converts, to electric energy, energy generated from fossil fuels such as coal, heavy oil, and the like.

A large-scale thermoelectric power plant is equipped with, for example, a boiler configured to generate vapor and a generator configured to convert rotatory power to electricity. In contrast, a gas turbine and a diesel engine have been used as a rotary engine for relatively small-scale self-thermoelectric power generation.

Coal employed as a main material in the thermoelectric power plant includes carbon, oxygen, hydrogen, nitrogen, and the like, in chemical aspects, and also contains the large quantity of organic and inorganic compounds. The organic compounds refer to sediment left after vegetable materials buried underground go through biological, physical, and chemical processes, and may also be referred to as maceral.

In general, a thermoelectric power plant using coal as a main fuel involves feeding coal to a boiler in large quantities, thereby combusting the large quantity of coal. Accordingly, the thermoelectric power plant generates the electricity by generating high temperature and high pressure vapor and by supplying the generated vapor to a vapor turbine. Here, coal ashes resulting from the combustion generate 5 to 22% of incompletely combusted materials. Such waste material is classified into bottom ashes and fly ashes.

A portion of the fly ashes have been used as a component of Portland cement corresponding to raw materials for cement and the bottom ashes corresponding to inorganic residues have been used as seal filling materials. However, there is a growing concern as to the environmental pollution by the fly ashes and the bottom ashes.

To reduce effects of environmental pollution, research is being conducted into recycling waste discharged from a thermoelectric power plant.

For example, Korean Patent Application No. 10-2011-0092363, filed on Sep. 14, 2011, discloses a method for manufacturing a mineral pulp by use of scrapped coal materials.

SUMMARY

Embodiments provide a coal briquette manufacturing apparatus and method capable of adjusting a melting temperature of coal briquette or viscosity of a molten metal in which the coal briquette is melted based on a mixture ratio of materials used for manufacturing the coal briquette, and a mineral fiber manufacturing apparatus including the coal briquette manufacturing apparatus.

Embodiments also provide a coal briquette manufacturing apparatus and method capable of enhancing strength and formability of coal briquette by mixing materials for manufacturing coal briquette with binding materials at a predetermined mixture ratio, and a mineral fiber manufacturing apparatus including the coal briquette manufacturing apparatus.

Embodiments also provide a coal briquette manufacturing apparatus and method capable of enhancing the manufacturing efficiency of mineral fibers by alternately inserting coal briquette and cokes at an appropriate mixture ratio and by optimizing a melting condition of coal briquette, and a mineral fiber manufacturing apparatus including the coal briquette manufacturing apparatus.

Embodiments also provide a furnace that may efficiently elevate a temperature of air supplied from a blower using the heat of exhaust gas discharged through an exhaust gas outlet, and a mineral fiber manufacturing apparatus including the furnace.

Embodiments also provide a furnace that may efficiently combust cokes in the furnace by supplying the air for combustion of cokes to the furnace and accordingly, may efficiently melt coal briquette, and a mineral fiber manufacturing apparatus including the furnace.

Embodiments also provide a furnace that may acquire hot water by providing a water jacket on an outer wall of the furnace and by cooling the outer wall of the furnace, and a mineral fiber manufacturing apparatus including the furnace.

Embodiments also provide a furnace that may reduce a space required for installation by optimally installing the furnace, a heat exchanger, and a re-combustor, and a mineral fiber manufacturing apparatus including the furnace.

Embodiments also provide a re-combustion apparatus that may remove impurities within exhaust gas discharged from a furnace by re-combusting or perfectly combusting the exhaust gas and thereby may prevent the air pollution by the exhaust gas, and a mineral fiber manufacturing apparatus including the re-combustion apparatus.

Embodiments also provide a re-combustion apparatus that may sufficiently re-combust or perfectly combust exhaust gas within a heat accumulator by extending a stay time of the exhaust gas in the heat accumulator, and a mineral fiber manufacturing apparatus including the re-combustion apparatus.

Embodiments also provide a re-combustion apparatus that may provide a heat source to be adjacent to a heat accumulator and thereby may maintain an inside temperature of the heat accumulator to be at a high temperature before exhaust gas flows in the heat accumulator or while the exhaust gas passes through the heat accumulator, and a mineral fiber manufacturing apparatus including the re-combustion apparatus.

Embodiments also provide a re-combustion apparatus that may provide dual dams within a re-combustion chamber and thereby change a flow path of exhaust gas within the re-combustion chamber and may efficiently remove combustion residues of impurities within the exhaust gas, and a mineral fiber manufacturing apparatus including the re-combustion apparatus.

According to an embodiment, there is provided a coal briquette manufacturing apparatus including a material storage configured to store a plurality of materials for manufacturing coal briquette; a material mixer configured to mix the plurality of materials discharged from the material storage; a coal briquette manufacturer configured to manufacture the coal briquette by press-forming the materials mixed in the material mixer; and a conveyor provided to the material storage, the material mixer, or the coal briquette manufacturer, and configured to transport the plurality of materials or the coal briquette. The plurality of materials may include coal ashes, dolomite, and limestone, and a weight of the coal ashes may be 70 to 80% of an entire weight of the plurality of materials.

A weight of the dolomite may be 10 to 15% of the entire weight of the plurality of materials, and a weight of the limestone may be 10 to 15% of the entire weight of the plurality of materials.

The coal briquette manufacturing apparatus may further include a material processor configured to connect to the material storage or the material mixer, and to process the plurality of materials before the plurality of materials is mixed. The material processor may be configured to process grain sizes of the dolomite and the limestone to be 1 to 5 mm.

Binding materials for binding the plurality of materials may be added to the material mixer, and a weight of the added binding materials may be 3 to 4% of the entire weight of the plurality of materials.

A weighing equipment may be further provided to the material storage, and the plurality of materials may be measured using the weighing equipment based on a preset mixture ratio and discharged from the material storage.

A mixed material storage and a weighing equipment may be further provided between the material mixer and the coal briquette manufacturer, and the coal ashes, the dolomite, and the limestone stored in the mixed material storage may be measured based on preset amounts and discharged.

According to an embodiment, there is provided a mineral fiber manufacturing apparatus including a coal briquette manufacturer configured to manufacture coal briquette for manufacturing mineral fibers, and to store the manufactured coal briquette; a furnace including an inlet through which coal briquette and cokes manufactured in the coal briquette manufacturer are inserted and an outlet through which a molten metal in which the coal briquette is melted is discharged; and a mineral fiber manufacturer configured to manufacture the mineral fibers from the molten metal discharged from the furnace. The coal briquette manufacturer may be configured to adjust a melting temperature of the coal briquette or a viscosity of the molten metal discharged from the furnace based on a mixture ratio of materials.

A weight of cokes to be inserted in the furnace may be 30 to 50% of an entire weight of the coal briquette, and the coal briquette and the cokes may be alternately inserted in the furnace.

The coal briquette manufacturer may be configured to manufacture the coal briquette through mixture of coal ashes, dolomite, and limestone. A weight of the coal ashes may be 70 to 80% of an entire weight of the coal ashes, the dolomite, and the limestone, a weight of the dolomite may be 10 to 15% of the entire weight of the coal ashes, the dolomite, and the limestone, and a weight of the limestone may be 10 to 15% of the entire weight of the coal ashes, the dolomite, and the limestone.

Binding materials may be added to the coal ashes, the dolomite, and the limestone, and the binding materials may be added so that a weight of the binding materials is to be 3 to 4% of the entire weight of the coal ashes, the dolomite, and the limestone.

According to an embodiment, there is provided a method of manufacturing coal briquette, the method including discharging coal ashes, dolomite, and limestone from a material storage; inserting the coal ashes, the dolomite, and the limestone in a material mixer; inserting binding materials in the material mixer; mixing the coal ashes, the dolomite, the limestone, and the binding materials in the material mixer; transporting the mixed coal ashes, dolomite, limestone, and binding materials to a coal briquette manufacturer; and press-forming the mixed coal ashes, dolomite, limestone, and binding materials in the coal briquette manufacturer. The coal ashes, the dolomite, the limestone, and the binding materials may be inserted in the material mixer at a preset mixture ratio.

The inserting of the coal ashes, the dolomite, and the limestone may include inserting the coal ashes, the dolomite, and the limestone in the material mixer, so that a weight of the coal ashes to be inserted in the material mixer is 70 to 80% of an entire weight of the coal ashes, the dolomite, and the limestone, a weight of the dolomite to be inserted in the material mixer is 10 to 15% of the entire weight of the coal ashes, the dolomite, and the limestone, and a weight of the limestone to be inserted in the material mixer is 10 to 15% of the entire weight of the coal ashes, the dolomite, and the limestone.

The inserting of the binding materials may include inserting the binding materials in the material mixer so that a weight of the binding materials to be inserted in the material mixer is 3 to 4% of the entire weight of the coal ashes, the dolomite, and the limestone.

The discharging of the coal ashes, the dolomite, and the limestone may include quantitatively measuring the coal ashes, the dolomite, and the limestone based on a preset mixture ratio and discharging the measured coal ashes, dolomite, and limestone from the material storage.

The coal briquet manufacturing method may further include between the mixing of the coal ashes, the dolomite, the limestone, and the binding materials and the transporting of the mixed coal ashes, dolomite, limestone, and binding materials, storing the mixed coal ashes, dolomite, limestone, and binding materials in a mixed material storage; and discharging the mixed coal ashes, dolomite, limestone, and binding materials from the mixed material storage. The mixed coal ashes, dolomite, limestone, and binding materials may be quantitatively measured in and discharged from the mixed material storage.

According to an embodiment, there is provided a furnace including a first division including an inlet through which coal briquette and cokes for manufacturing mineral fibers are inserted and an exhaust gas outlet through which exhaust gas by combustion of the cokes is discharged; a second division downwardly extending from the first division; a third division downwardly extending from the second division; and a fourth division downwardly extending from the third division, and including a molten metal outlet through which a molten metal in which the coal briquette is melted is discharged. The first division, the second division, the third division, and fourth division may communicate with each other, and the coal briquette and the cokes inserted through the inlet may stacked from the fourth division toward the first division. The air heated by the exhaust gas discharged through the exhaust gas outlet of the first division may be supplied to the fourth division.

The furnace may further include a combustion air supply line configured to supply the air to the fourth division. The combustion air supply line may include a first supply line provided in a ring shape and configured to wrap around the outer peripheral surface of the third division; and a second supply line downwardly extending from the first supply line and then extending from one side of the fourth division toward an inner space. The air heated by the exhaust gas discharged through the exhaust gas outlet may be supplied to the first supply line, and may be supplied from the first supply line to the fourth division through the second supply line.

A plurality of second supply lines may be connected to the first supply line, and the plurality of second supply lines may be disposed to face each other on the fourth division.

A valve may be provided to the second supply line, and may be configured to control an amount of combustion air to be supplied to the fourth division.

The furnace may further include a burner configure to ignite the cokes. The burner may be disposed on one side of the fourth division in a direction in which the air is supplied from the second supply line.

The furnace may further include a plurality of water jackets configured to wrap around the outside of the second division. The plurality of water jackets may include a first water jacket configured to be supplied with cooling water; and a second water jacket upwardly separated from the first water jacket along a lengthwise direction of the second division. The cooling water supplied to the first water jacket may be transported to the second water jacket.

The heat generated from the furnace may be transferred to the plurality of water jackets to discharge the cooling water supplied to the first water jacket as hot water through the second water jacket.

According to an embodiment, there is provided a mineral fiber manufacturing apparatus including a furnace including an inlet through which coal briquette and cokes for manufacturing mineral fibers are inserted, a first exhaust gas outlet through which exhaust gas by combustion of the cokes is discharged, and a molten metal outlet through which a molten metal in which the coal briquette is melted is discharged; a heat exchanger disposed to be separate from one side of the furnace and in which the exhaust gas discharged through the first exhaust gas outlet flows; and a blower disposed in a lower portion of the furnace or between the furnace and the heat exchanger, and configured to supply the heat exchanger with the air having a temperature lower than a temperature of the exhaust gas. The air supplied from the blower may be heated by the exhaust gas flowing in the heat exchanger, and supplied to an inside of the furnace to combust the cokes.

The heat exchanger may include an exhaust gas inlet provided at an upper end of the heat exchanger and through which the exhaust gas discharged through the first exhaust gas outlet flows in the heat exchanger; an exhaust gas passage downwardly extending from the upper end of the heat exchanger toward a lower end of the heat exchanger, and configured to provide a travel route of the exhaust gas flowing through the exhaust gas inlet; and a second exhaust gas outlet provided at the lower end of the heat exchanger, and through which the exhaust gas having passed through the exhaust gas passage is discharged. A temperature of the exhaust gas discharged through the second exhaust gas outlet may be dropped to be lower than a temperature of the exhaust gas flowing through the exhaust gas inlet.

The heat exchanger may include a combustion air inlet disposed to be adjacent to the second exhaust gas outlet, and through which the air discharged from the blower flows in the heat exchanger; a combustion air passage configured to provide a travel route of the air flowing through the combustion air inlet; and a combustion air outlet disposed to be adjacent to the exhaust gas inlet, and configured to discharge the air having passed through the combustion air passage. A temperature of the air discharged through the combustion air outlet may be elevated to be greater than a temperature of the air flowing through the combustion air inlet.

The combustion air passage may be provided to wrap around the outer peripheral surface of the exhaust gas passage in a spiral form, and the heat of the exhaust gas flowing along the exhaust gas passage may be transferred to the air flowing along the combustion air passage.

The furnace may further include a combustion air supply line. The combustion air supply line may include a first supply line provided in a ring shape and configured to wrap around the outer peripheral surface of the furnace; and a second supply line downwardly extending from the first supply line and then extending toward an inner space of the furnace by passing through one side of the furnace. The air discharged through the combustion air outlet may flow in the first supply line.

The combustion air outlet may be disposed above the first supply line and the second supply line, and the combustion air inlet may be disposed between the first supply line and the second supply line.

The furnace may further include a plurality of water jackets configured to wrap around the outer peripheral surface of the furnace and to transfer the heat generated from the furnace, and cooling water flowing through one of the plurality of water jackets may be discharged as hot water through another one of the plurality of water jackets.

The mineral fiber manufacturing apparatus may further include a water tank configured to store the water to be supplied to the plurality of water jackets; and a pump configured to connect to the water tank, and to supply the water supplied from the water tank to the plurality of water jackets. One of the plurality of water jackets may be connected to the pump and another one of the plurality of water jacket may be connected to the water tank.

The plurality of water jackets may include a first water jacket; and a second water jacket upwardly separated from the first water jacket along a lengthwise direction of a reducing zone. The first water jacket may be connected to the pump and the second water jacket may be connected to the water tank.

The mineral fiber manufacturing apparatus may further include a re-combustor configured to completely combust the exhaust gas discharged through the first exhaust gas outlet and having passed through the heat exchanger; and a mineral fiber manufacturer configured to manufacture mineral fibers from the a molten metal discharged through the molten metal outlet.

According to an embodiment, there is provided a re-combustion apparatus including: a re-combustion chamber including an inflow opening through which exhaust gas flows in and an exhaust opening through which the inflowed exhaust gas is discharged; a heat source provided on one side of the re-combustion chamber, and configured to supply a heat toward an inside of the re-combustion chamber; and a heat accumulator provided on the inflow opening within the re-combustion chamber, and configured to accumulate the heat from the heat source. The exhaust gas flowed in through the inflow opening is re-combustible while passing through the heat accumulator.

According to an aspect, an air gap may be formed on the heat accumulator to enable the exhaust gas to flow in or be discharged, and the air gap may communicate with the inflow opening.

According to an aspect, the re-combustion apparatus may further include a preventer configured to remove combustion residues of impurities within the exhaust gas from the exhaust gas.

According to an aspect, the preventer may include a first dam, and an inner space of the re-combustion chamber may be partitioned by the first dam.

According to an aspect, the preventer may include a second dam, and the second dam may be separated from the first dam toward the exhaust opening.

According to an aspect, a first via-hole may be formed on a top of the first dam, and a second via-hole may be formed on a bottom of the second dam, and the combustion residues may fall down while passing through the first via-hole or the second via-hole.

According to an aspect, a hopper may be provided between the first dam and the second dam, and the combustion residues of impurities within the exhaust gas may be externally dischargeable through the hopper.

According to another embodiment, there is provided a mineral fiber manufacturing apparatus including: a furnace configured to melt raw materials for manufacturing mineral fibers; and a re-combustion chamber including an inflow opening through which exhaust gas discharged from the furnace flows in and an exhaust opening through which the in-flowed exhaust gas is dischargeable, and in which the in-flowed exhaust gas is re-combustible. The inflow opening may be provided in a lower portion of the re-combustion chamber and the exhaust opening may be provided in an upper portion of the re-combustion chamber. The re-combustion chamber may include a first flow path, a second flow path, and a third flow path configured to transport the exhaust gas. The first flow path may extend from the inflow opening toward an upper portion, the second flow path may extend from the upper portion toward a lower portion, and the third flow path may extend from the lower portion toward the exhaust opening.

According to an aspect, a first dam may be provided between the first flow path and the second flow path within the re-combustion chamber, and a second dam may be provided between the second flow path and the third flow path.

According to an aspect, a first via-hole may be formed on a top of the first dam, and the exhaust gas may be transported from the first flow path to the second flow path through the first via-hole. A second via-hole may be formed on a bottom of the second dam, and the exhaust gas may be transported from the second flow path to the third flow path through the second via-hole.

According to an aspect, combustion residues of impurities within the exhaust gas may fall down while passing through the first via-hole and the second via-hole, and a hopper downwardly extending from the re-combustion chamber may be provided between the second flow path and the third flow path, and the combustion residues fallen down through the hopper may be externally dischargeable through the hopper.

According to an aspect, a heat accumulator provided on the inflow opening and a heat source configured to heat the heat accumulator may be provided within the re-combustion chamber, and a portion of the first flow path may be formed within the heat accumulator.

According to an aspect, a fan may be provided between the furnace and the re-combustion chamber, and a flow of the exhaust gas discharged from the furnace may be guidable by the fan.

Effects

According to a coal briquette manufacturing apparatus and method and a mineral fiber manufacturing apparatus including the coal briquette manufacturing apparatus according to embodiments, it is possible to adjust a melting temperature of coal briquette or viscosity of a molten metal in which the coal briquette is melted, based on a mixture ratio of materials used for manufacturing the coal briquette.

Also, according to a coal briquette manufacturing apparatus and method and a mineral fiber manufacturing apparatus including the coal briquette manufacturing apparatus according to embodiments, it is possible to enhance strength and formability of coal briquette by mixing materials for manufacturing coal briquette with binding materials at a predetermined mixture ratio.

Also, according to a coal briquette manufacturing apparatus and method and a mineral fiber manufacturing apparatus including the coal briquette manufacturing apparatus according to embodiments, it is possible to enhance the manufacturing efficiency of mineral fibers by alternately inserting coal briquette and cokes at an appropriate mixture ratio and by optimizing a melting condition of coal briquette.

According to a furnace and a mineral fiber manufacturing apparatus including the furnace according to embodiments, it is possible to efficiently elevate a temperature of air supplied from a blower using the heat of exhaust gas discharged through an exhaust gas outlet.

Also, according to a furnace and a mineral fiber manufacturing apparatus including the furnace according to embodiments, it is possible to efficiently combust cokes in the furnace by supplying the air for combustion of cokes to the furnace and accordingly, to efficiently melt coal briquette.

Also, according to a furnace and a mineral fiber manufacturing apparatus including the furnace according to embodiments, it is possible to acquire hot water by providing a water jacket on an outer wall of the furnace and by cooling the outer wall of the furnace.

Also, according to a furnace and a mineral fiber manufacturing apparatus including the furnace according to embodiments, it is possible to reduce a space required for installation by optimally installing the furnace, a heat exchanger, and a re-combustor.

According to a re-combustion apparatus and a mineral fiber manufacturing apparatus including the re-combustion apparatus according to embodiments, it is possible to remove impurities within exhaust gas discharged from a furnace by re-combusting or perfectly combusting the exhaust gas, and thereby to prevent the air pollution by the exhaust gas.

Also, according to a re-combustion apparatus and a mineral fiber manufacturing apparatus including the re-combustion apparatus according to embodiments, it is possible to sufficiently re-combust or perfectly combust exhaust gas within a heat accumulator by extending a stay time of the exhaust gas in the heat accumulator.

Also, according to a re-combustion apparatus and a mineral fiber manufacturing apparatus including the re-combustion apparatus according to embodiments, it is possible to maintain an inside temperature of a heat accumulator to be at a high temperature before exhaust gas flows in the heat accumulator or while the exhaust gas passes through the heat accumulator by providing a heat source to be adjacent to the heat accumulator.

Also, according to a re-combustion apparatus and a mineral fiber manufacturing apparatus including the re-combustion apparatus according to embodiments, it is possible to change a flow path of exhaust gas within a re-combustion chamber and to efficiently remove combustion residues of impurities within the exhaust gas by providing dual dams within the re-combustion chamber.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
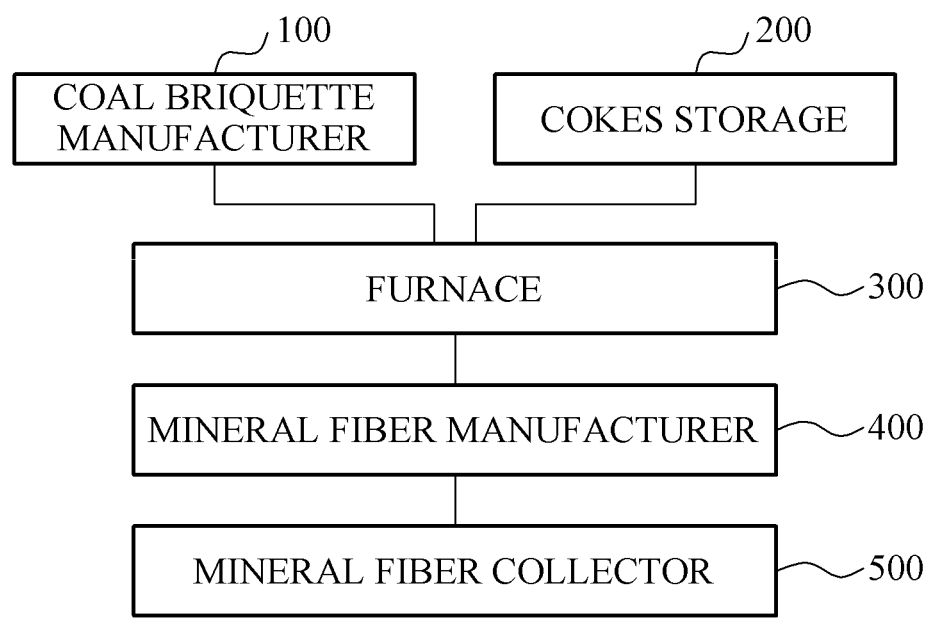
FIG. 1 illustrates a configuration of a mineral fiber manufacturing apparatus according to an embodiment.

Reference will now be made in detail to embodiments of the present invention, examples of which are illustrated in the accompanying drawings, wherein like reference numerals refer to like elements throughout. Embodiments are described below to explain the present invention by referring to the figures.

Figure 2:
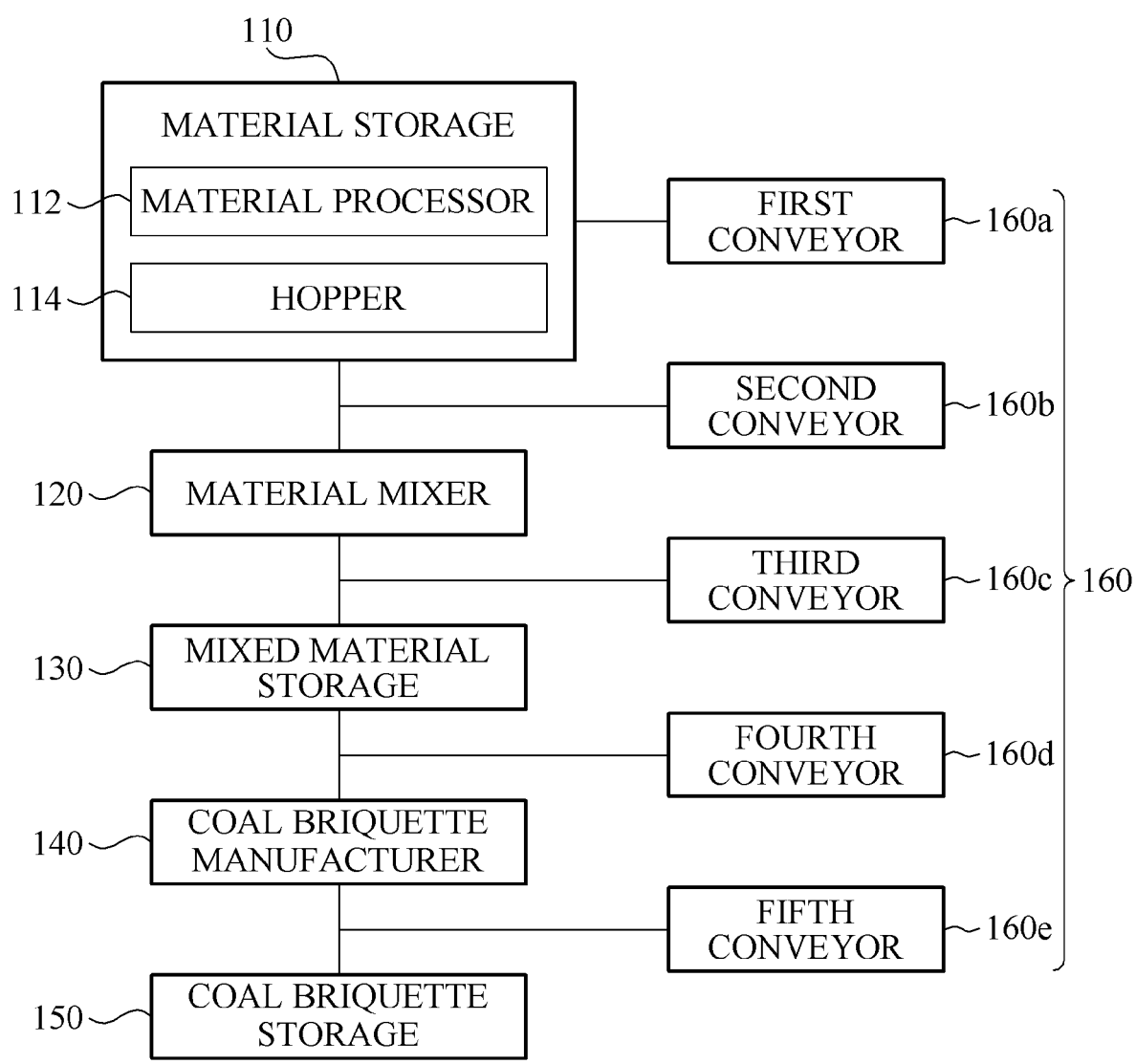
FIG. 2 illustrates a configuration of a coal briquette manufacturer of FIG. 1.
Figure 3:
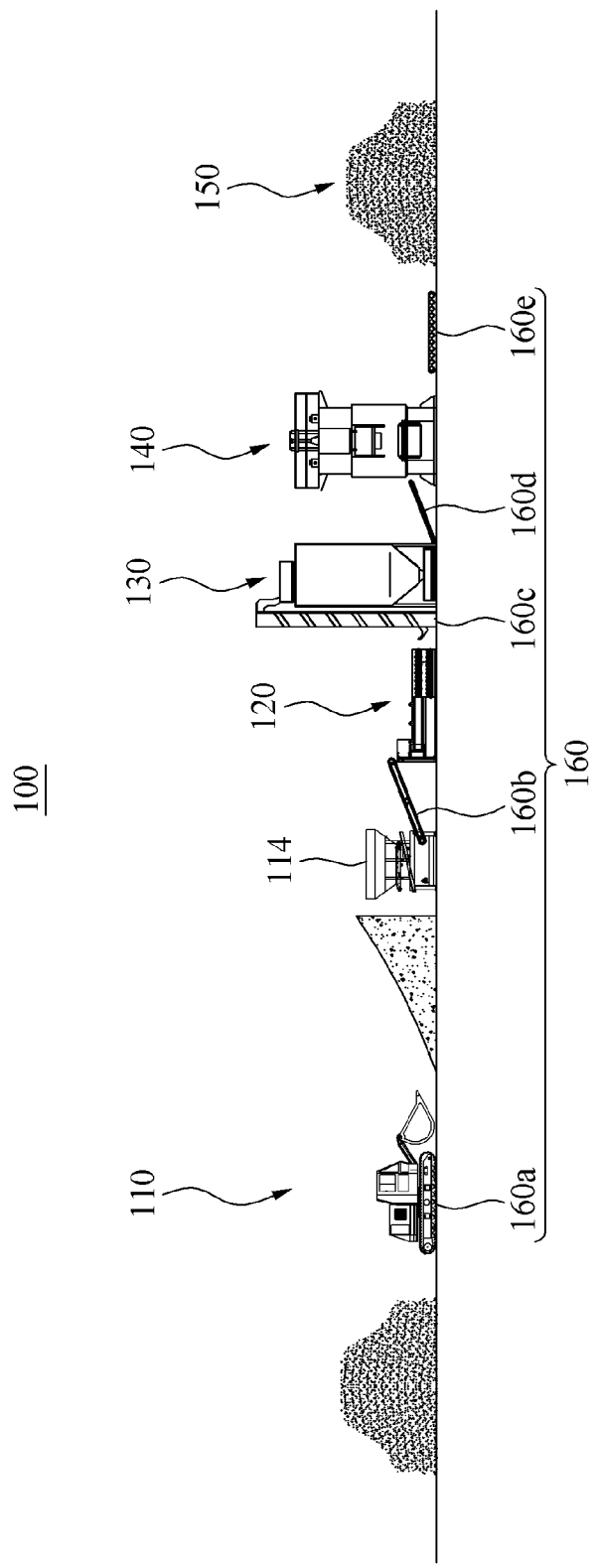
FIG. 3 illustrates a process of a coal briquette manufacturer of FIG. 2 manufacturing coal briquette.
Figure 4:
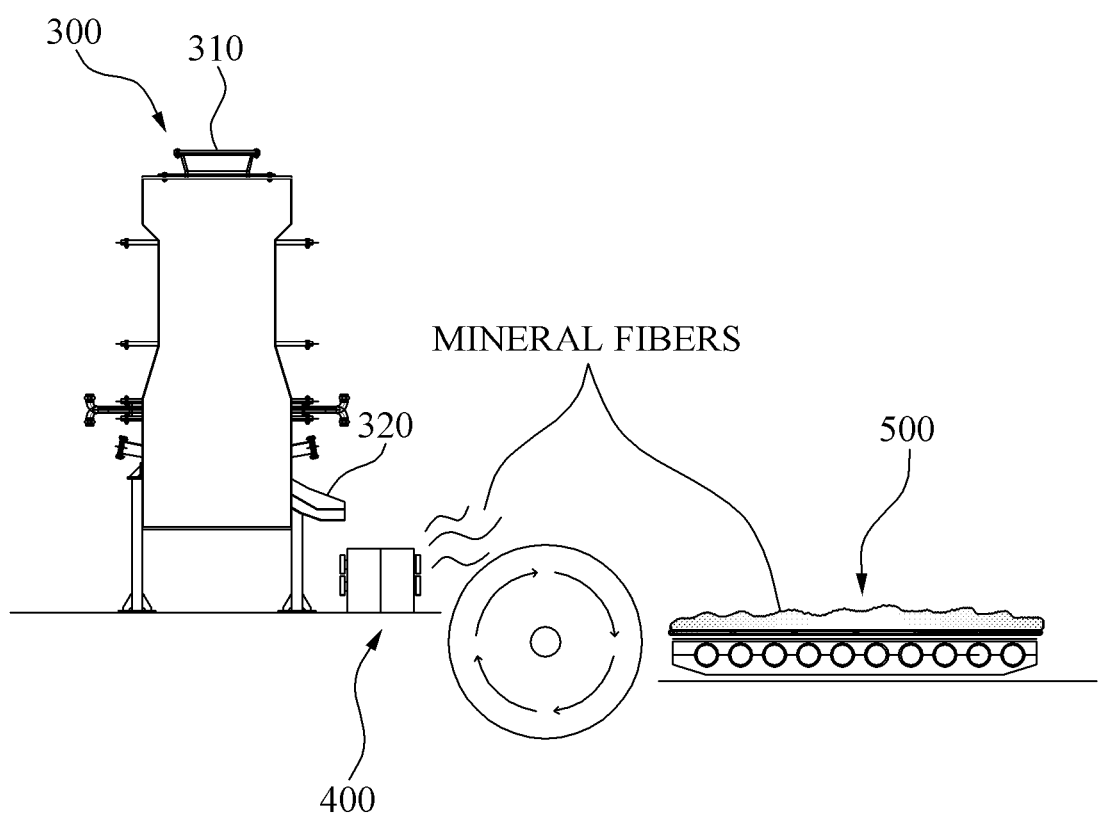
FIG. 4 illustrates an example of coal briquette, produced from a coal briquette manufacturer, which is inserted in a furnace and is manufactured into mineral fibers.

FIG. 1 illustrates a configuration of a mineral fiber manufacturing apparatus according to an embodiment, FIG. 2 illustrates a configuration of a coal briquette manufacturer of FIG. 1, FIG. 3 illustrates a process of a coal briquette manufacturer of FIG. 2 manufacturing coal briquette, and FIG. 4 illustrates an example of coal briquette, produced from a coal briquette manufacturer, which is inserted in a furnace and is manufactured into mineral fibers.

Referring to FIG. 1, the mineral fiber manufacturing apparatus 10 may include a coal briquette manufacturer 100, a cokes storage 200, a furnace 300, a mineral fiber manufacturer 400, and a mineral fiber collector 500.

Coal briquette may be manufactured in the coal briquette manufacturer 100.

The coal briquette, which may also be referred to as oval briquet, may be produced by mixing and press-forming coal ashes, dolomite (CaMg $(Co_3)_2$), and limestone.

Referring to FIGS. 2 and 3, the coal briquette manufacturer 100 may include a material storage 110, a material mixer 120, a mixed material storage 130, a coal briquette manufacturer 140, a coal briquette storage 150, and a conveyor 160.

A plurality of materials for manufacturing coal briquette may be stored in the material storage 110.

The plurality of materials may include coal ashes, dolomite, and limestone.

In detail, the coal ashes refer to residual ashes after burning coal in a thermoelectric plant and the like, and may be classified based on grain sizes of particles and thereby maintained.

The dolomite CaMg $(Co_3)_2$ includes barytocalcite in which calcium carbonate and magnesium carbonate are mixed at a 1:1 ratio, and indicates a rhombus crystal, and a crystal face is slightly curved. Further, the dolomite has a gradient of 3.5 to 4, has a weight of 2.8 to 2.9, and has a complete split in a rhombus direction.

The limestone generally refers to fine-grained and bulky apedal rock. An appearance color of limestone may be white or gray in color, and with dark gray or black impurities.

Each of the coal ashes, the dolomite, and the limestone may be stored in the separate material storage 110, or may be stored in a separate division within the same material storage 110.

Also, a material processor 112 may be further provided to the material storage 110.

The material processor 112 may process materials for manufacturing coal briquette to have a grain size within a predetermined range.

For example, dolomite and limestone inserted in the material processor 112 may be processed to have a grain size of 5 mm or less, for example, of 1 to 5 mm.

Since dolomite and limestone become to have regular grain sizes through the material processor 112, coal ashes, dolomite, and limestone for manufacturing coal briquette may be further uniformly mixed, which may affect strength of coal briquette or a melting temperature of coal briquette.

Also, a hopper 114 is provided to the material storage 110, and the plurality of materials stored in the material storage 110, may be discharged through the hopper 114 to be used for manufacturing coal briquette.

For example, coal ashes, dolomite, and limestone may be inserted through upper ends of different hoppers 114, respectively, and be discharged through lower ends of the different hoppers 114, respectively.

Here, weighing equipment (not shown) is provided to each hopper 114 so that coal ashes, dolomite, and limestone may be quantitatively discharged from the hoppers 114.

In addition, although not illustrated, the weighing equipment may be automatically controlled by a controller (not shown) and may operate based on a mixture ratio of coal ashes, dolomite, and limestone, input from the controller.

For example, when the controller sets a mixture ratio of coal ashes, dolomite, and limestone as 8:1:1, weights of coal ashes, dolomite, and limestone may be measured in the weighing equipment so that a weight of coal ashes occupies 80% of an entire weight of coal ashes, dolomite, and limestone, a weight of dolomite occupies 10% of the entire weight of coal ashes, dolomite, and limestone, and a weight of limestone occupies 10% of the entire weight of coal ashes, dolomite, and limestone.

Also, when the controller sets a mixture ratio of coal ashes, dolomite, and limestone as 7:1.5:1.5, weights of coal ashes, dolomite, and limestone may be measured in the weighing equipment so that a weight of coal ashes occupies 70% of entire weight of coal ashes, dolomite, and limestone, a weight of dolomite occupies 15% of the entire weight of coal ashes, dolomite, and limestone, and a weight of limestone occupies 15% of the entire weight of coal ashes, dolomite, and limestone.

With regard to manufacturing coal briquette, a mixture ratio of coal ashes, dolomite, and limestone may have a relatively great relevance with properties of coal briquette.

The properties of coal briquette may include a melting temperature of coal briquette or viscosity of a molten metal in which the coal briquette is melted. The mixture ratio of coal ashes, dolomite, and limestone to achieve a desirable melting temperature of coal briquette or the viscosity of molten metal in which coal briquette is melted may follow as.

The coal ashes may be mixed at the ratio of 70 to 80% of the entire weight of coal ashes, dolomite, and limestone, the dolomite may be mixed at the ratio of 10 to 15% of the entire weight of coal ashes, dolomite, and limestone, and the limestone may be mixed at the ratio of 10 to 15% of the entire weight of coal ashes, dolomite, and limestone.

For example, when the entire weight of coal ashes, dolomite, and limestone is 100 kilograms (kg), coal ashes may be 80 kg, dolomite may be 10 kg, and limestone may be 10 kg. Alternatively, coal ashes may be 70 kg, dolomite may be 15 kg, and limestone may be 15 kg.

The aforementioned plurality of materials discharged from the material storage 110 may be transported to the material mixer 120.

The material mixer 120 may be provided as, for example, a double shaft mixer of a continuous type. The double shaft mixer may include a mixer drum, a driving motor, a worm reducer, and an inlet through which materials are inserted in the mixer drum. Further, a pair of shafts may be provided in the mixer drum.

Coal ashes, dolomite, and limestone may be uniformly mixed in the material mixer 120.

In addition thereto, binding materials may be additionally added to and mixed in the material mixer 120.

The binding materials may be provided as, for example, inorganic binder. The inorganic binder may include clay, mica, and serpentine, which are inert and incombustible or non-dissolvable at the event of combustion of a heat source. The inorganic binder is inflammable at the temperature which the flammable heat source reaches at the event of combustion and thus, may remain still after ignition and combustion of the heat source.

Also, binding materials may be inserted in the material mixer 120 so that a weight of the binding materials may be 3 to 4% of the entire weight of coal ashes, dolomite, and limestone inserted in the material mixer 120.

The mixture ratio of binding materials may affect a process of manufacturing coal briquette in the coal briquette manufacturer 140.

In detail, the mixture ratio of binding materials may affect the formability of the mixed coal ashes, dolomite, and limestone and the strength of coal briquette.

Accordingly, appropriate mixing of binding materials may enhance or appropriately maintain the strength of coal briquette. Further, the formability of mixed coal ashes, dolomite, and limestone may be improved, thereby enhancing the work efficiency associated with manufacturing coal briquette.

As described above, coal ashes, dolomite, limestone, and binding materials mixed in the material mixer 120 may be transported to the mixed material storage 130.

Coal ashes, dolomite, limestone, and binding materials mixed at an appropriate ratio may be stored in the mixed material storage 130.

Also, weighing equipment (not shown) may be provided to the mixed material storage 130 so that the quantitatively mixed materials may be discharged from the mixed material storage 130.

The mixed materials discharged from the mixed material storage 130 may be transported to the coal briquette manufacturer 140.

The coal briquette manufacturer 140 may be provided as, for example, an oil-hydraulic press, and the transported mixed materials may be press-formed in the coal briquette manufacturer 140.

For example, the coal briquette manufacturer 140 may include a support on which the mixed materials transported from the mixed material storage 130 are to be placed and a presser configured to press the mixed materials placed on the support.

Although not illustrated in detail, an operation of the coal briquette manufacturer 140 may be controlled by the controller. In addition, an operability of the coal briquette manufacturer 140 and a press magnitude to be applied from the coal briquette manufacturer 140 may be controlled by the controller.

However, configurations controlled by the controller are not limited thereto and overall matters associated with internal and external environments of the coal briquette manufacturer 100 may be controlled by the controller.

Coal briquette produced from the coal briquette manufacturer 140 may be transported to the coal briquette storage 150. The coal briquette stored in the coal briquette storage 150 may be transported from the coal briquette storage 150 when the stored coal briquette is required to manufacture mineral fibers.

The conveyor 160 may be configured to be disposed in between of the material storage 110, the material mixer 120, the mixed material storage 130, the coal briquette manufacturer 140, and the coal briquette storage 150.

The conveyor 160 may include a first conveyor 160a, a second conveyor 160b, a third conveyor 160c, a fourth conveyor 160d, and a fifth conveyor 160e.

The first conveyor 160a refers to equipment to transport materials present in the material storage 110, and may be provided as, for example, heavy equipment such as a forklift truck or an excavator, to be capable of containing materials in a bucket and transporting the materials.

For example, the first conveyor 160a may stack materials at a relatively high height to be easily inserted in the upper end of the hopper 114.

The second conveyor 160b may be provided as a conveyor belt configured to connect the lower end of the hopper 114 and the inlet provided in an upper portion of the material mixer 120.

Accordingly, the second conveyor 160b may be inclined from the lower end of the hopper 114 toward the inlet provided in the upper portion of the material mixer 120.

In detail, materials inserted in the upper end of the hopper 114 may be quantitatively discharged through the lower end of the hopper 114. The materials discharged through the lower end of the hopper 114 may be transported toward the inlet provided in the upper portion of the material mixer 120.

The third conveyor 160c may transport the materials mixed in the material mixer 120 to the mixed material storage 130.

The third conveyor 160c may be provided as, for example, a bucket elevator, and may be provided to connect an upper end of the mixed material storage 130 from one end of the material mixer 120.

In detail, the materials mixed in the material mixer 120 may be contained in the bucket of the third conveyor 160c and the bucket may be moved to an upper portion by an elevator. When the bucket reaches the inlet provided at the upper end of the material storage 130, the mixed materials contained in the bucket may be inserted in the material storage 130 by an operation of the bucket.

The fourth conveyor 160d may be provided as a conveyor belt to connect the coal briquette manufacturer 140 from a lower end of the mixed material storage 130.

For example, the fourth conveyor 160d may be inclined from the lower end of the mixed material storage 130 to connect the support of the coal briquette manufacturer 140.

The fifth conveyor 160e may transport the coal briquette manufactured in the coal briquette manufacturer 140 to the coal briquette storage 150.

As described above, the conveyor 160 in various forms may be disposed in the coal briquette manufacturer 100 and an operation of the conveyor 160 may be controlled by the controller. Also, coal briquette may be manufactured within an automated system.

Accordingly, the manufacturing efficiency of coal briquette may be enhanced, which may lead to manufacturing the same quality coal briquette at a faster speed.

The coal briquette manufactured in the coal briquette manufacturer 100 may be inserted in the furnace 300.

Referring to FIG. 4, the furnace 300 may include an inlet 310 and an outlet 320.

The inlet 310 may be provided at an upper end of the furnace 300, and the outlet 320 may be provided on one side to be close to a lower end of the furnace 300.

Materials for manufacturing mineral fibers may be inserted in the furnace 300 through the inlet 310.

Here, the materials for manufacturing mineral fibers may include coal briquette and cokes.

The coal briquette may be coal briquette manufactured in the coal briquette manufacturer 100, and may be transported from the coal briquette storage 150 or the coal briquette manufacturer 140 to the inlet 310 of the furnace 300 through, for example, a conveyor (not shown).

The cokes may be stored in a cokes storage 200 prior to being inserted in the furnace 300, and may be transported from the cokes storage 200 to the inlet 310 of the furnace 300 through a conveyor (not shown).

Here, the cokes may be inserted in the inlet 310 of the furnace 300 in order to melt the coal briquette.

In detail, each of coal briquette and cokes may be quantitatively inserted in the inlet 310 of the furnace 300.

For example, a weight of cokes to be inserted in the inlet 310 of the furnace 300 may be 30 to 50% of an entire weight of coal briquette, desirably, 40% of the entire weight of coal briquette.

The mixture ratio of coal briquette and cokes may be suitable for completely melting the coal briquette in the furnace 300.

Accordingly, coal briquette and cokes quantitatively discharged from the coal briquette manufacturer 100 and the cokes storage 200 through the weighing equipment, respectively, may be inserted in the inlet 310 of the furnace 300 through the conveyor.

Further, although not illustrated in detail, coal briquette and cokes may be alternately inserted in the furnace 300. For example, cokes, coal briquette, cokes, and coal briquette may be sequentially inserted in the furnace 300.

Accordingly, cokes disposed on a bottom of the furnace 300 may sufficiently heat an internal space of the furnace 300. Cokes disposed between coal briquette and coal briquette may sufficiently melt the coal briquette disposed on the cokes. Accordingly, it is possible to optimize a melting condition of coal briquette within the furnace 300, which may lead to enhancing the manufacturing efficiency of mineral fibers.

While materials for manufacturing mineral fibers, that is, coal briquet and cokes fed through the inlet 310 of the furnace 300 is going through a process of a pre-heating zone, a reducing zone, a combusting zone, and a melting zone, organic compounds of mineral fibers contained in the coal briquet may be melted.

Here, the controller may control the quantity of air and oxygen to be inserted in order to sufficiently excessively supply oxygen in the reducing zone and thereby increase the combustion efficiency.

The controller may control an inner temperature and an exhaust temperature of the furnace 300, so that the inner temperature of the furnace 300 is maintained at the temperature of about 1500° C., and the exhaust temperature of the furnace 300 is maintained at the temperature of about 300 to 500° C.

Here, the inner temperature of the furnace 300 may reach a high temperature enough to melt coal briquet and cokes.

Accordingly, an outside iron plate of the furnace 300 and refractory built inside the furnace 300 may be designed to have a sufficient thickness to be capable of enduring a high temperature inside the furnace 300. Depending on necessity, a variety of cooling methods may be employed.

Also, as described above, the inner temperature of the furnace 300 for melting coal briquette may be adjusted based on the mixture ratio of the plurality of materials, for example, coal ashes, dolomite, and limestone, for manufacturing coal briquette.

For example, the mixture ratio of the plurality of materials may be adjusted to fit for the inner temperature of the furnace 300. Alternatively, the inner temperature of the furnace 300 may be adjusted by adjusting the mixture ratio of the plurality of materials.

Further, the controller may control a melting rate within the furnace 300, the quantity of coal briquette and cokes to be inserted in the inlet 310 of the furnace 300, and the like.

Through the aforementioned process, the inserted materials may be discharged in a melted state through the outlet 320 of the furnace 300. Hereinafter, the melted matter discharged through the outlet 320 is referred to as a molten metal.

As described above, the viscosity of the molten metal may be adjusted based on the mixture ratio of coal ashes, dolomite, and limestone that are manufacturing materials of coal briquette.

For example, to acquire the desirable viscosity of molten metal for manufacturing mineral fibers, a weight of coal ashes may be 70 to 80% of an entire weight of coal ashes, dolomite, and limestone, a weight of dolomite may be 10 to 15% of the entire weight of coal ashes, dolomite, and limestone, and a weight of limestone may be 10 to 15% of the entire weight of coal ashes, dolomite, and limestone.

The molten metal may be prepared at the temperature of 1500 to 1600° C., for example, at the temperature of 1550° C.

The high temperature molten metal may be fed to the mineral fiber manufacturer 400.

The mineral fiber manufacturer 400 may be disposed below the outlet 320 of the furnace 300.

For example, a plurality of rotating spinners may be provided to the mineral fiber manufacturer 400, and the molten metal may be inserted in a space between the plurality of spinners.

Here, a cooling water spray hole and a synthetic resin spray hole may be provided to the mineral fiber manufacturer 400. Cooling water may be sprayed through the cooling water spray hole and synthetic resin may be sprayed through the synthetic resin spray hole.

The cooling water may be sprayed to prevent the synthetic resin sprayed through the synthetic resin spray hole from being carbonized by the high temperature molten metal. Accordingly, it is possible to enhance the manufacturing efficiency of mineral fibers using the mineral fiber manufacturer 400.

The manufactured mineral fibers may be collected by the mineral fiber collector 500.

Although not illustrated, the mineral fiber collector 500 may include a vibrating leveler and a vertical pendulum configured to apply a vibration to mineral fibers to have a predetermined density and thickness, a forming M/C configured to form the mineral fibers processed to have the predetermined density and thickness by the vibrating leveler and the vertical pendulum, a cutting M/C configured to cut the mineral fibers compressed by the forming M/C based on a predetermined size, and a packaging M/C configured to package the mineral fibers cut by the cutting M/C.

In this instance, the controller may control operations of the vibrating leveler, the vertical pendulum, the forming M/C, the cutting M/C, and the packaging M/C.

For example, an operator may set an operating time and a vibrating level of each of the vibrating leveler and the vertical pendulum, and may also set an operating time and pressure strength of the forming M/C.

A coal briquette manufacturing apparatus according to an embodiment and a mineral fiber manufacturing apparatus including the same are described above. Hereinafter, a coal briquette manufacturing method according to an embodiment will be described.

Figure 5:
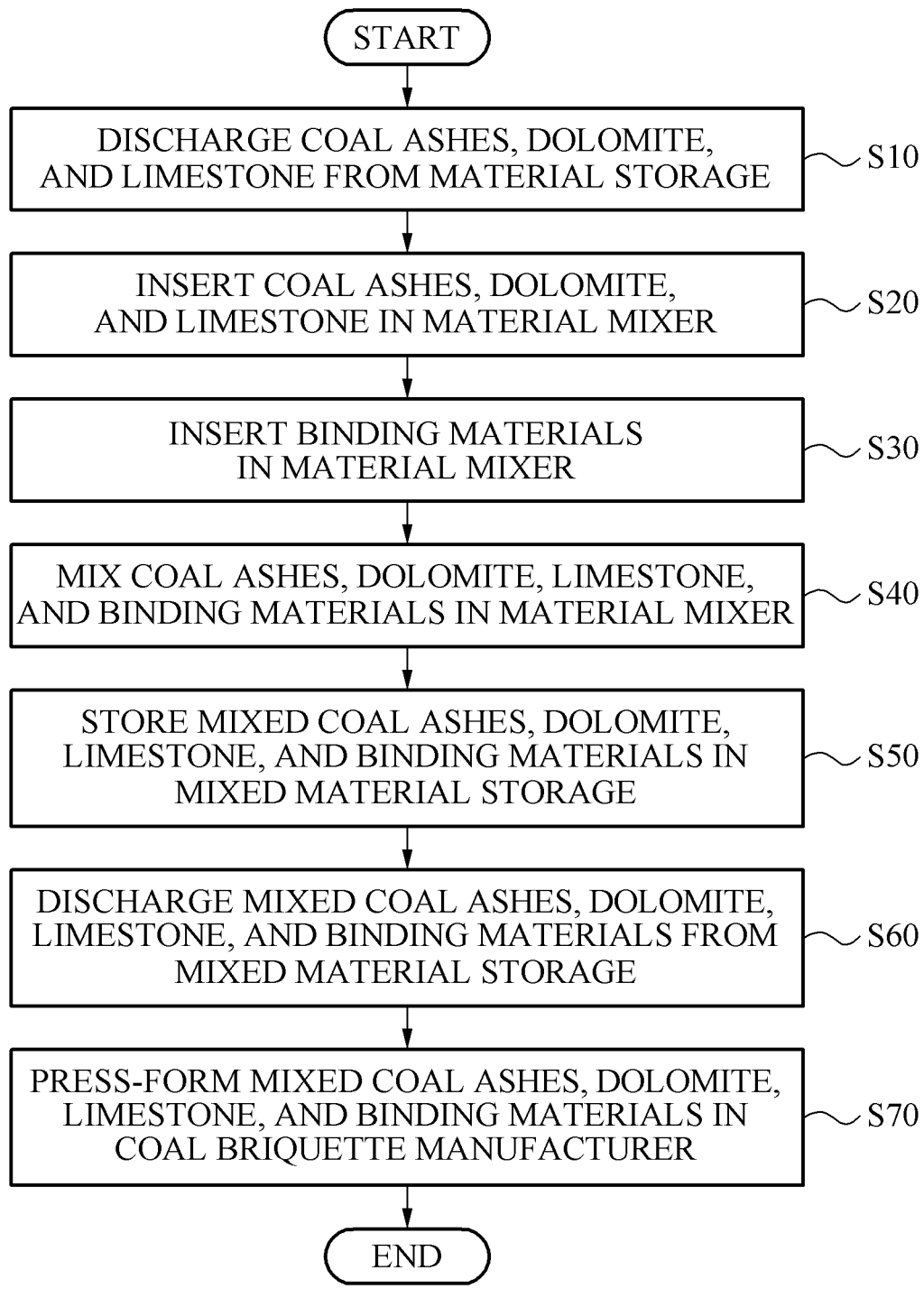
FIG. 5 is a flowchart illustrating a method of manufacturing coal briquette according to an embodiment.

A method of manufacturing coal briquette according to an embodiment will be described with reference to FIG. 5.

In operation S10, coal ashes, dolomite, and limestone are discharged from a material storage.

Here, coal ashes, dolomite, and limestone may be measured based on a preset mixture ratio of coal ashes, dolomite, and limestone and thereby quantitatively discharged.

For example, a weight of coal ashes may be 70 to 80% of an entire weight of coal ashes, dolomite, and limestone, a weight of dolomite may be 10 to 15% of the entire weight of coal ashes, dolomite, and limestone, and a weight of limestone may be 10 to 15% of the entire weight of coal ashes, dolomite, and limestone.

The mixture ratio of coal ashes, dolomite, and limestone may affect a melting temperature of coal briquette and viscosity of melted coal briquette. The melting temperature of coal briquette and the viscosity of melted coal briquette may be adjusted by adjusting the mixture ratio of coal ashes, dolomite, and limestone.

In operation S20, coal ashes, dolomite, and limestone discharged from the material storage are inserted in a material mixer.

As described above, quantitatively measured coal ashes, dolomite, and limestone may be inserted in the material mixer.

In operation S30, binding materials are inserted in the material mixer.

For example, a weight of binding materials to be inserted may be 3 to 4% of the entire weight of coal ashes, dolomite, and limestone.

The binding materials are to bind coal ashes, dolomite, or limestone, and may enhance the strength of coal briquette to be manufactured.

Also, since an appropriate binding force is provided to coal ashes, dolomite, and limestone, workability may be improved when manufacturing coal briquette.

In operation S40, coal ashes, dolomite, limestone, and binding materials are mixed in the material mixer.

In operation S50, the mixed coal ashes, dolomite, limestone, and binding materials are stored in a mixed material storage.

A conveyor may be provided between the material mixer and the mixed material storage. The mixed coal ashes, dolomite, and limestone may be transported to the mixed material storage through the conveyor.

In operation S60, the mixed coal ashes, dolomite, limestone, and binding materials are discharged from the mixed material storage.

Here, the mixed coal ashes, dolomite, limestone, and binding materials may be quantitatively measured in the mixed material storage and thereby discharged.

In operation S70, the mixed coal ashes, dolomite, limestone, and binding materials are transported to a coal briquette manufacturer.

In operation S70, the mixed coal ashes, dolomite, limestone, and binding materials are press-formed in the coal briquette manufacturer.

For example, an oil-hydraulic press may be provided to the coal briquette manufacturer to manufacture the mixed coal ashes, dolomite, and limestone in a form of coal briquette through press-forming.

Through the above process, coal briquette may be manufactured, and coal ashes, dolomite, and limestone may be measured and discharged based on a preset mixture ratio. Accordingly, it is possible to manufacture coal briquette having the same or different properties based on the preset mixture ratio.

A coal briquette manufacturing apparatus and a mineral fiber manufacturing apparatus including the same according to embodiments may adjust a melting temperature of coal briquette or viscosity of a molten metal in which the coal briquette is melted, based on a mixture ratio of materials used for manufacturing the coal briquette, may enhance strength and formability of coal briquette by mixing materials for manufacturing coal briquette with binding materials at a predetermined mixture ratio, and may enhance the manufacturing efficiency of mineral fibers by alternately inserting coal briquette and cokes at an appropriate mixture ratio and by optimizing a melting condition of coal briquette.

Figure 6:
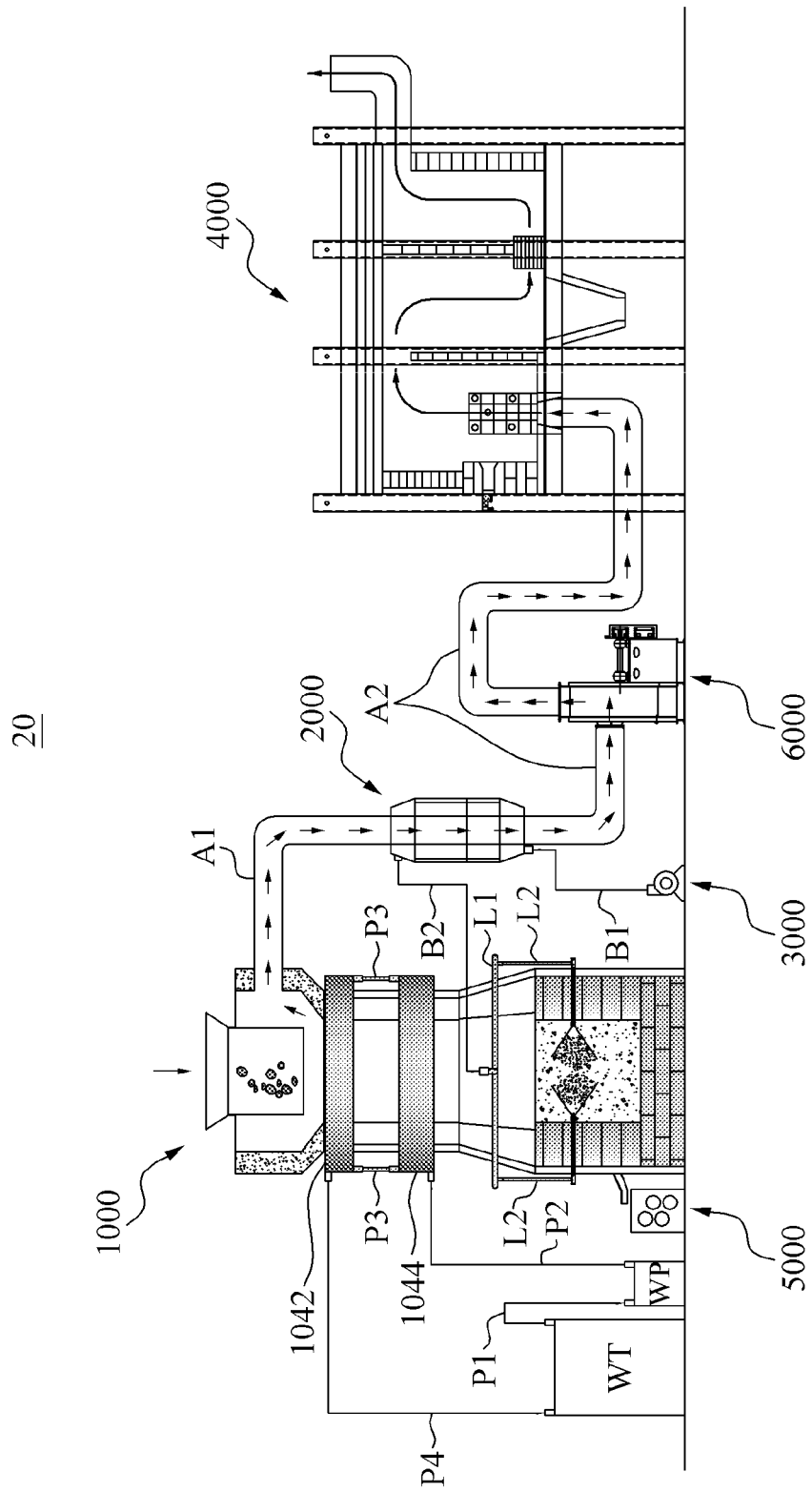
FIG. 6 illustrates a configuration of a mineral fiber manufacturing apparatus according to an embodiment.
Figure 7:
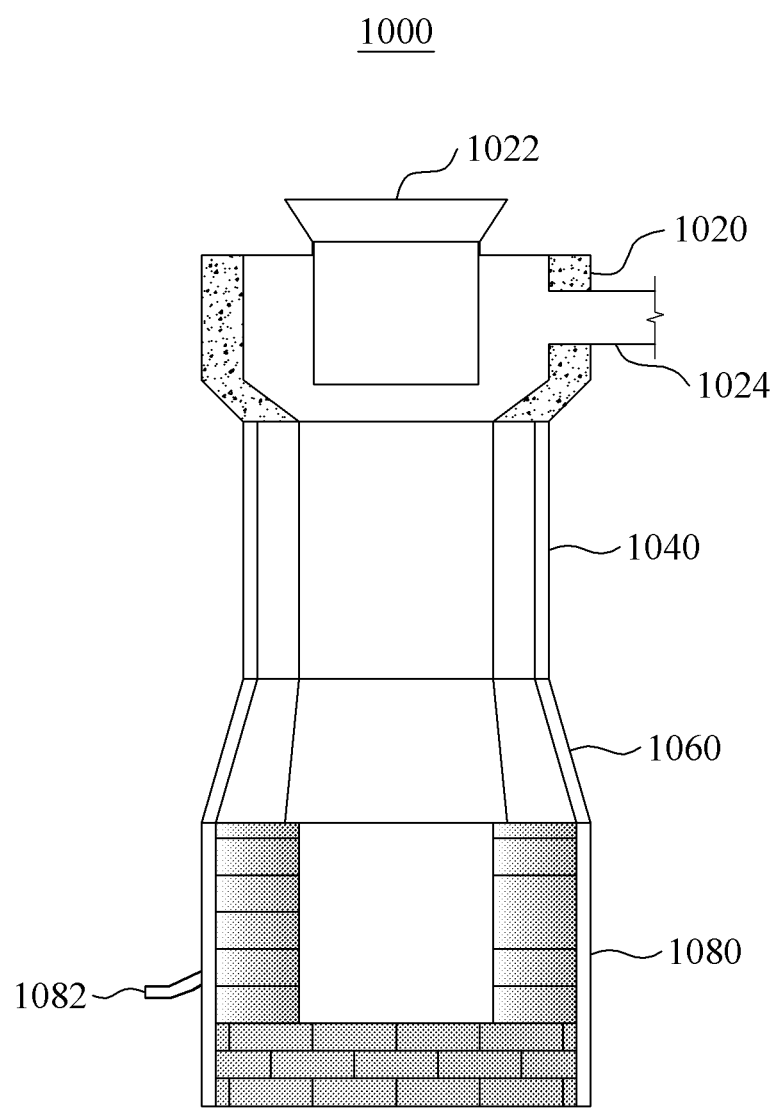
FIG. 7 is a cross-sectional view illustrating a furnace of a mineral fiber manufacturing apparatus according to an embodiment.
Figure 8:
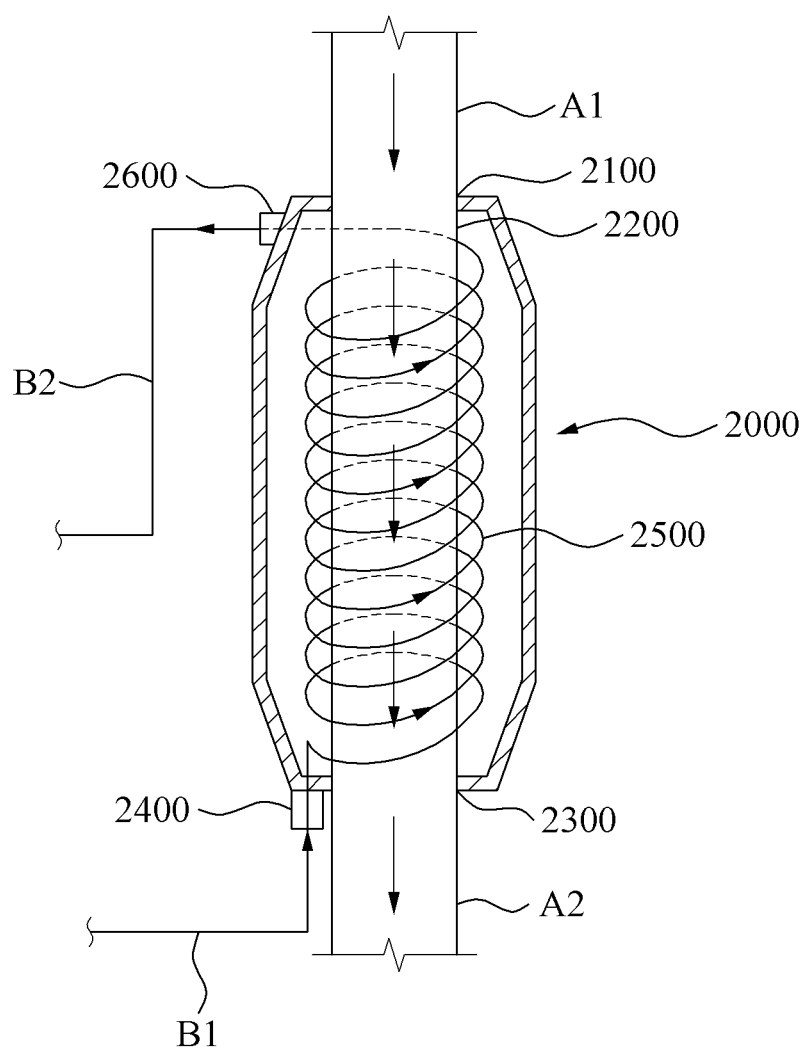
FIG. 8 is a cross-sectional view illustrating a heat exchanger of a mineral fiber manufacturing apparatus according to an embodiment.

FIG. 6 illustrates a configuration of a mineral fiber manufacturing apparatus according to an embodiment, FIG. 7 is a cross-sectional view illustrating a furnace of a mineral fiber manufacturing apparatus according to an embodiment; and FIG. 8 is a cross-sectional view illustrating a heat exchanger of a mineral fiber manufacturing apparatus according to an embodiment.

Referring to FIG. 6, the mineral fiber manufacturing apparatus 20 may include a furnace 1000, a heat exchanger 2000, a blower 3000, a re-combustor 4000, and a mineral fiber manufacturer 5000.

In detail, referring to FIG. 7, the furnace 1000 may include a first division 1020, a second division 1040, a third division 1060, and a fourth division 1080.

The furnace 1000 may be divided into a total of four divisions from an upper end of the furnace 1000 to a lower end of the furnace 1000. The first division 1020, the second division 1040, the third division 1060, and the fourth division 1080 may communicate with each other.

In detail, the first division 1020 may extend from the upper end of the furnace 1000 toward the lower end of the furnace 1000. Here, a portion of the first division 1020 adjacent to an inlet 1022 may extend with a predetermined diameter, and a portion of the first division 1020 adjacent to the second division 104 may be provided in a cone shape with a decreasing diameter.

The inlet 1022 through which coal briquette and cokes for manufacturing mineral fibers are inserted may be provided at an upper end of the first division 1020.

In this instance, coal briquette and cokes inserted through the inlet 1022 may be transported toward the first division 1020, the second division 1040, the third division 1060, and the fourth division 1080, and may be stacked from the fourth division 1080 toward the first division 1020.

Hereinafter, coal briquette and cokes inserted through the inlet 1022 will be described.

The coal briquette may be produced by mixing and press-forming coal ashes, dolomite (CaMg $(Co_3)_2$), and limestone.

In detail, the coal ashes refer to residual ashes after burning coal in a thermoelectric plant and the like, and may be classified based on sizes of particles of coal ashes and thereby maintained.

The dolomite CaMg $(Co_3)_2$ includes barytocalcite in which calcium carbonate and magnesium carbonate are mixed at a 1:1 ratio, and indicates a rhombus crystal, and a crystal face is slightly curved. Further, the dolomite has a gradient of 3.5 to 4, has a weight of 2.8 to 2.9, and has a complete split in a rhombus direction.

The limestone generally refers to fine-grained and bulky apedal rock. An appearance color of limestone may be white or gray in color, and with dark gray or black impurities.

The coal ashes, dolomite, and limestone may be transported and stored based on a particle size unit having a predetermined range to be uniformly mixed. Here, a storage of coal ashes, dolomite, and limestone may include a plurality of weighing equipments.

Although not illustrated in detail, a coal briquette manufacture for manufacturing coal briquette may be provided. Coal ashes, dolomite, and limestone may be simultaneously fed to the coal briquette manufacturer at a preset mixture ratio, and preset quantitative special bonding materials may also be inserted therein.

Further, the mixture ration may be selectively adjusted if necessary. The mixture ratio between each material and special bonding materials may also be variably applied.

An appearance color of cokes may be black with gray shading and also has metallic gloss. The cokes have fixed carbon as a primary component and slightly contain ash content and volatile matter. In terms of technical analysis values, the cokes generally include 80 to 94% fixed carbon, 6 to 18% ash content, and 0.5 to 2% volatile matter. In terms of elementary analysis values, the cokes include 80 to 92% carbon, 1 to 1.5% hydrogen, 0.5 to 0.9% nitrite, 0.4 to 0.7% oxygen, 0.5 to 1% sulfur, and 6 to 18% volatile matter. Also, the cokes have a caloric power of 6000 to 7500 kilocalories (kcal) per 1 kilogram (kg), and have an ignition temperature of 400 to 600° C.

The aforementioned coal briquette and cokes may be alternately inserted in the furnace 1000.

For example, when cokes are inserted in the furnace 1000 through the inlet 1022, coal briquette may be inserted through the inlet 1022. Next, cokes may be inserted through the inlet 1022 and then coal briquette may be inserted again through the inlet 1022.

As described above, by alternately inserting coal briquette and cokes in the furnace 1000, it is possible to efficiently melt the coal briquette, thereby enhancing the manufacturing efficiency of mineral fibers.

A first exhaust gas outlet 1024 through which exhaust gas by combustion of cokes is discharged may be provided to the first division 1020.

For example, the first exhaust gas outlet 1024 may be provided on one side of the first division 1020, for example, one side of a portion in which the first division 1020 has a predetermined diameter.

The high temperature of exhaust gas may be generated with cokes being combusted in the furnace 1000. The exhaust gas generated in a lower portion of the furnace 1000, for example, the third division 1060 or the fourth division 1080 may be transported toward the first division 1020 and may be externally discharged from the furnace 1000 through the first exhaust gas outlet 1024.

Here, the exhaust gas discharged through the first exhaust gas outlet 1024 may be at the temperature of about 900° C. to 1000° C. and the exhaust gas may include impurities in addition to gas.

Also, coal briquette and cokes inserted in the furnace 1000 may be stacked up to a location lower than a location of the first exhaust gas outlet 1024 in the first division 1020. Further, as melting of coal briquette and combustion of cokes are ongoing in the furnace 1000, a height of coal briquette and cokes stacked in the furnace 1000 may gradually decrease.

As described above, from the height of coal briquette and cokes stacked in the furnace 1000, a progress status about melting of coal briquette and combustion of cokes in the furnace 1000 may be predicted. Whether coal briquette and cokes are to be additionally inserted may be determined.

The second division 1040 may be disposed below the first division 1020.

The second division 1040 may be connected at the lower end of the first division 1020, and may downwardly extend therefrom with a predetermined diameter.

Here, a plurality of water jackets may be provided to wrap around the outside of the second division 1040.

The plurality of water jackets may include a first water jacket 1042 and a second water jacket 1044.

The first water jacket 1042 may be provided to wrap around the second division 1040, and the second water jacket 1044 may also be provided to wrap around the second division 1040 and may be upwardly separated from the first water jacket 1042 along a lengthwise direction of the second division 1040.

A water tank WT and a pump WP may be connected to the first water jacket 1042 and the second water jacket 1044. The plurality of water jackets, the water tank WT, and the pump WP may be connected by a plurality of flow paths.

The water tank WT may be disposed to be adjacent to the first water jacket 1042 and the second water jacket 1044, and may serve to store cooling water to be supplied to the first water jacket 1042 and to store hot water discharged from the second water jacket 1044. Since the water tank WT is disposed at a location lower than locations of the first water jacket 1042 and the second water jacket 1044, the pump WP is connected to the water tank WT and the water stored in the water tank WT may be supplied to the first water jacket 1042.

Also, the plurality of flow paths may include a first flow path P1 through which the water within the water tank WT is transported to the pump WP, a second flow path P2 through which the water discharged from the pump WP is transported to the first water jacket 1042, a third flow path P3 through which the water discharged from the first water jacket 1042 is transported to the second water jacket 1044, and a fourth flow path P4 through which the water discharged from the second water jacket 1044 is transported to the water tank WT.

Here, a plurality of third flow paths P3 may be provided so that the cooling water supplied to the first water jacket 1042 may be fed to the second water jacket 1044 at a plurality of points of the first water jacket 1042.

By the cooling water circulating through the first water jacket 1042 and the second water jacket 1044, the heat transferred from an inner wall of the furnace 100 to an outer wall of the furnace 100 may be cooled down.

In addition, when the cooling water flows along the first flow path P1 or the second flow path P2, the hot water may flow along the fourth flow path P4 whereby the hot water may be acquired from the furnace 1000.

The third division 1060 may be disposed below the second division 1040.

The third division 1060 may be connected at a lower end of the second division 1040 and may downwardly extend therefrom with an increasing diameter.

A portion of a combustion air supply line may be provided on an outside of the third division 1060, and the combustion air supply line may include the first supply line L1 and the second supply line L2. A further description will be made hereinafter.

The fourth division 1080 may be disposed below the third division 1060.

The fourth division 1080 may be connected at a lower end of the third division 1060 and may downwardly extend therefrom with a predetermined diameter.

In detail, a molten metal outlet 1082 through which a molten metal in which coal briquette is melted is discharged may be provided on one side of a lower portion of the fourth division 1080.

The molten metal discharged through the molten metal outlet 1082 may be transported to the mineral fiber manufacturer 5000 and may be produced into mineral fibers.

Although not illustrated in detail, a burner mounter may be provided on another side of the fourth division 1080 and a burner (not shown) for igniting cokes may be provided within the burner mounter.

Here, the burner may be disposed in a direction in which a second supply line L2 passes through one side of the fourth division 1080 and supplies the air.

The air may be supplied through the second supply line L2 as combustion air for combusting cokes and the second supply line L2 may communicate with the first supply line L1.

In detail, the first supply line L1 may be provided in a ring shape to wrap around the outer peripheral surface of the third division 1060, and the second supply line L2 may downwardly extend from the first supply line L1 and then extend from one side of the fourth division 1080 toward an inner space.

Here, the air heated by the exhaust gas discharged from the first exhaust gas outlet 1024 may be supplied to the first supply line L1, and then supplied from the first supply line L2 to the fourth division 108 through the second supply line L2.

Also, a plurality of second supply lines L2 may be connected to the first supply line L1, and the plurality of second supply lines L2 may be disposed to face each other on the fourth division 1080.

In addition, a valve (not shown) may be provided to the second supply line L2, and may control an amount of air supplied to the fourth division 1080.

As described above, an environment for efficient combustion of cokes may be provided in the fourth division 1080.

While coal briquette and cokes fed through the inlet 1022 of the furnace 1000 is going through a process of a pre-heating zone, a reducing zone, a combusting zone, and a melting zone, organic compounds of mineral fibers contained in the coal briquette may be melted.

Here, a controller (not shown) may control the quantity of air and oxygen to be inserted in order to sufficiently excessively supply oxygen in the reducing zone and thereby increase the combustion efficiency.

The controller may control an inner temperature and an exhaust temperature of the furnace 1000, so that the inner temperature of the furnace 1000 is maintained at the temperature of about 1500° C., and the exhaust temperature of the furnace 1000 is maintained at the temperature of about 900 to 1000° C.

Here, the inner temperature of the furnace 1000 may reach a high temperature enough to melt coal briquet and cokes.

Accordingly, an outside iron plate of the furnace 1000 and refractory built inside the furnace 1000 may be designed to have a sufficient thickness to be capable of enduring a high temperature inside the furnace 1000. Depending on necessity, a variety of cooling methods may be employed.

Further, the controller may control a melting rate within the furnace 1000, the quantity of materials to be inserted through the inlet 1022 of the furnace 1000, and the like.

Through the aforementioned process, coal briquette and cokes inserted through the inlet 1022 may be discharged in a form of exhaust gas or a molten metal.

The mineral fiber manufacturing apparatus 20 according to an embodiment is described based on the furnace 1000. Hereinafter, the mineral fiber manufacturing apparatus 20 according to an embodiment will be described based on the heat exchanger 2000 and the blower 3000.

The heat exchanger 2000 may be disposed to be separate from one side of the furnace 1000.

In detail, the heat exchanger 2000 may be separated from the furnace 1000 to face the molten metal outlet 1082 of the fourth division 1080.

An upper end of the heat exchanger 2000 may be disposed to be lower than the upper end of the furnace 1000, and a lower end of the heat exchanger 2000 may be disposed to be higher than the lower end of the furnace 1000.

Further, the blower 3000 may be disposed in a lower portion of the furnace 1000, or may be disposed between the furnace 1000 and the heat exchanger 2000.

Through the above arrangement of the furnace 1000, the heat exchanger 2000, and the blower 3000, the exhaust gas discharged through the first exhaust gas outlet 1024 of the furnace 1000 and the air discharged from the blower 3000 may pass through the heat exchanger 2000 and then be supplied to the furnace 1000.

In detail, referring to FIG. 8, the heat exchanger 2000 may include an exhaust gas inlet 2100, an exhaust gas passage 2200, and a second exhaust gas outlet 2300.

The exhaust gas inlet 2100 may be provided at the upper end of the heat exchanger 2000. The exhaust gas discharged through the first exhaust gas outlet 1024 may flow in the heat exchanger 2000 through the exhaust gas inlet 2100.

Here, the exhaust gas inlet 2100 may be connected to the first exhaust gas outlet 1024 by a first gas pipe A1.

The exhaust gas flowing in the exhaust gas inlet 2100 may have a temperature of 900 to 1000° C.

The exhaust gas passage 2200 may be connected to the exhaust gas inlet 2100.

For example, the exhaust gas passage 2200 may be connected to the first gas pipe A1, and may extend from the upper end of the heat exchange 2000 toward a lower end of the heat exchanger 2000.

Accordingly, the exhaust gas passage 2200 may provide a travel route of exhaust gas flowing in the exhaust gas inlet 2100.

The second exhaust gas outlet 2300 may be provided at the lower end of the heat exchanger 2000 and may discharge the exhaust gas having passed through the exhaust gas inlet 2100 and the exhaust gas passage 2200 to an outside of, that is, from the heat exchanger 200.

Also, the heat exchanger 2000 may further include a combustion air inlet 2400, a combustion air passage 2500, and a combustion air outlet 2600.

The combustion air inlet 2400 may be disposed to be adjacent to the second exhaust gas outlet 2300, so that the air discharged from the blower 3000 may flow in the heat exchanger 2000.

Here, a temperature of air flowing in the combustion air inlet 2400 may be significantly lower than a temperature of exhaust gas flowing in the exhaust gas inlet 2100. For example, the temperature of air flowing in the combustion air inlet 2400 may be substantially identical to a room temperature.

The combustion air passage 2500 may be connected to the combustion air inlet 2400.

For example, the combustion air passage 2500 may be connected to a first combustion air pipe (B1) and may extended from the lower end of the heat exchanger 2000 toward the upper end of the heat exchanger 2000.

Accordingly, the combustion air passage 2500 may provide a travel route of air flowing in the combustion air inlet 2400.

The combustion air outlet 2600 may be disposed to be adjacent to the exhaust gas inlet 2100 and may discharge the air having passed through the combustion air passage 2500 to an outside of the heat exchanger 2000.

Here, a temperature of exhaust gas discharged from the second exhaust gas outlet 2300 may be dropped to be lower than a temperature of exhaust gas flowing in the exhaust gas inlet 2100. A temperature of air discharged from the combustion air outlet 2600 may be elevated to be greater than a temperature of air flowing in the combustion air inlet 2400.

In detail, the combustion air passage 2500 may be provided to wrap around the outer peripheral surface of the exhaust gas passage 2200 in a spiral form, such as a coil, for example.

Through the above structure, the heat of exhaust gas flowing along the exhaust gas passage 2200 may be transferred to the air flowing along the combustion air passage 2500.

Accordingly, a temperature of exhaust gas discharged from the heat exchanger 2000, particularly, through the second exhaust gas outlet 230 may be 500° C. or less, and a temperature of air discharged from the heat exchanger 2000, particularly, through the combustion air outlet 260 may be 500° C.

Also, the air discharged from the heat exchanger 2000 may be supplied to the first supply line L1 through a second combustion air pipe B2, and may be transferred from the first supply line L1 to the second supply line (L2) and be supplied to the fourth division 1080 as the combustion air.

In this instance, the combustion air outlet 2600 may be disposed above the first supply line L1 and the second supply line L2, and the combustion air inlet 2300 may be disposed between the first supply line L1 and the second supply line L2.

Through the above arrangement, the air supplied from the blower 3000 may be efficiently supplied to an inner space of the fourth division 1080. Here, a flow velocity of air supplied to the inner space of the fourth division 1080 may be determined based on power of the blower 3000.

The exhaust gas discharged from the heat exchanger 2000 may be supplied to the re-combustor 400 through a second exhaust gas pipe A2. Here, a fan 6000 may be additionally provided between the heat exchanger 2000 and the re-combustor 4000.

As described above, a furnace and a mineral fiber manufacturing apparatus including the furnace according to embodiments may efficiently elevate a temperature of air supplied from a blower using the heat of exhaust gas discharged through an exhaust gas outlet, may efficiently combust cokes in a furnace by supplying the air for combustion of cokes to the furnace and accordingly, may efficiently melt coal briquette, may acquire the hot water by providing a water jacket on an outer wall of the furnace and by cooling the outer wall of the furnace, and may reduce a space required for installation by optimally installing the furnace, a heat exchanger, and a re-combustor.

Figure 9:
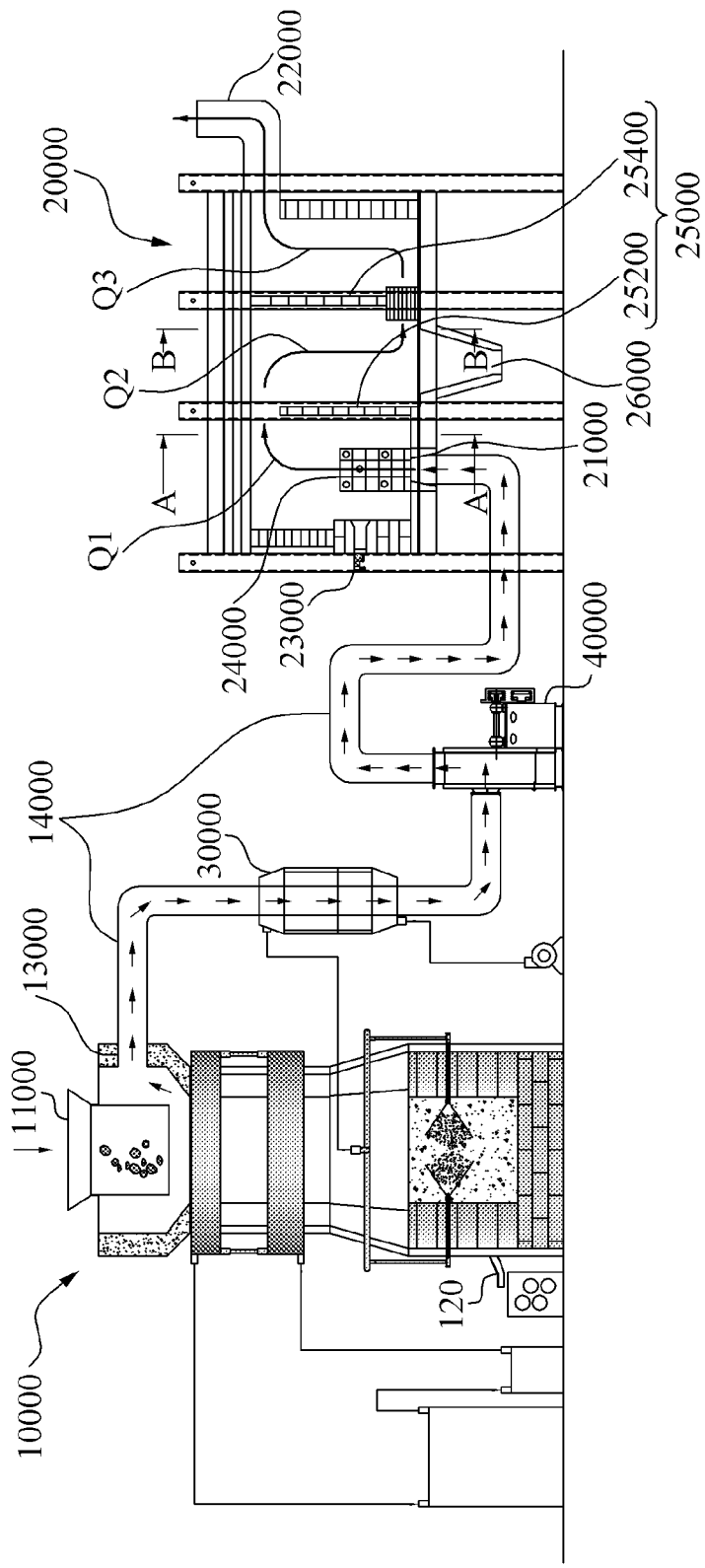
FIG. 9 illustrates a mineral fiber manufacturing apparatus according to an embodiment.
Figure 10:
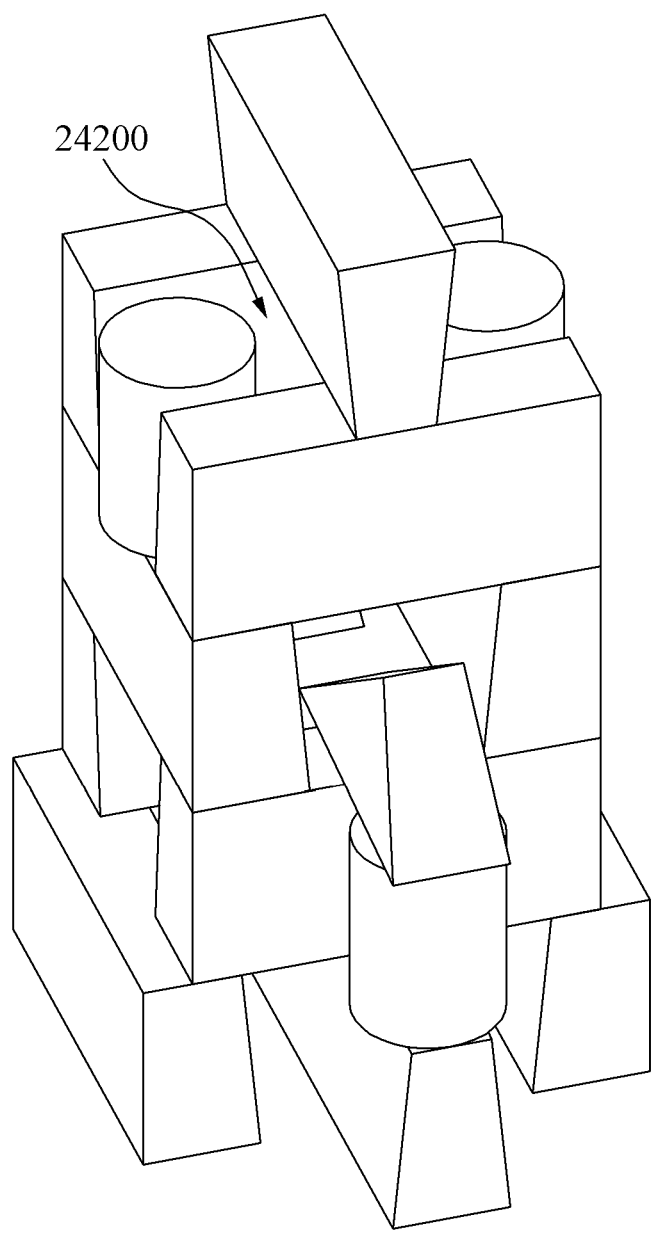
FIG. 10 is a perspective view illustrating a heat accumulator in a mineral fiber manufacturing apparatus according to an embodiment.
Figure 11:
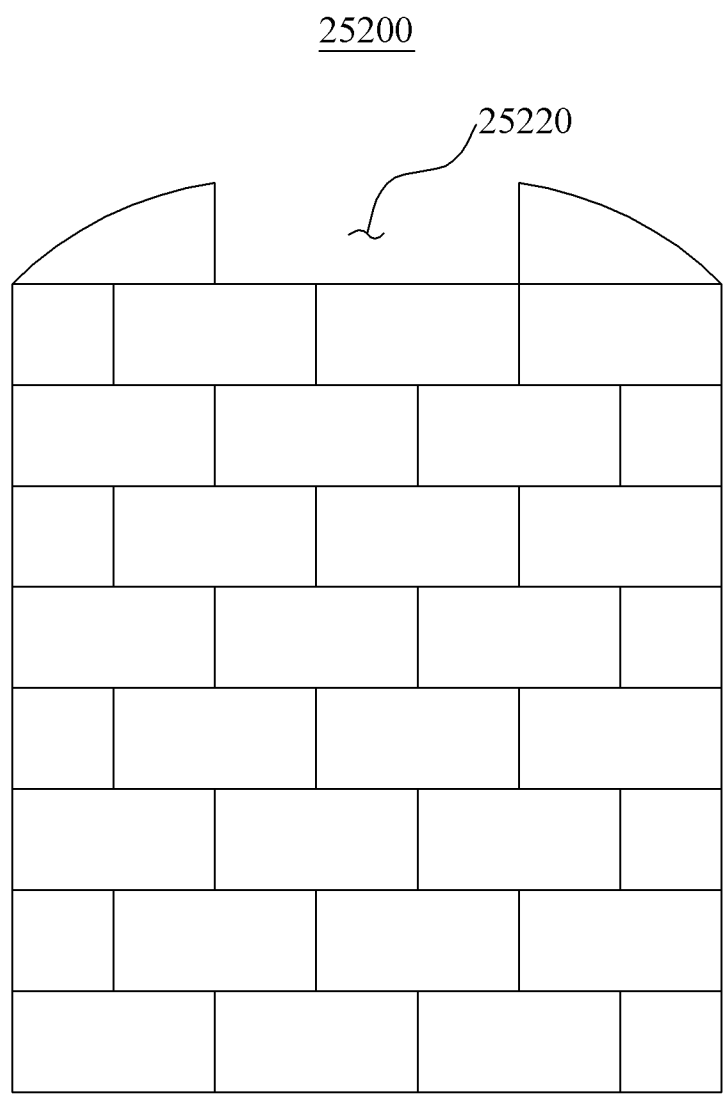
FIG. 11 is a cross-sectional view cut along line A-A of FIG. 9.
Figure 12:
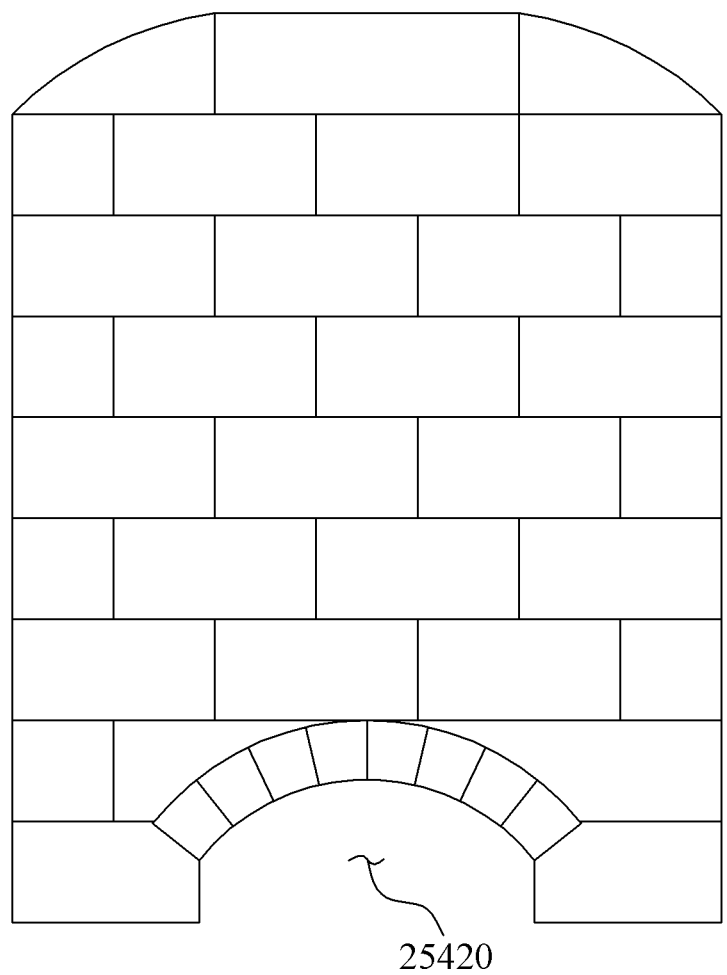
FIG. 12 is a cross-sectional view cut along line B-B of FIG. 9.

FIG. 9 illustrates a mineral fiber manufacturing apparatus according to an embodiment, FIG. 10 is a perspective view illustrating a heat accumulator in a mineral fiber manufacturing apparatus according to an embodiment, FIG. 11 is a cross-sectional view cut along line A-A of FIG. 9, and FIG. 12 is a cross-sectional view cut along line B-B of FIG. 9.

Referring to FIG. 9, a mineral fiber manufacturing apparatus 30 may include a furnace 10000 and a re-combustion chamber 20000.

The furnace 10000 may include an inlet 11000, an outlet 12000, and a first exhaust opening 13000.

The inlet 11000 may be provided at an upper end of the furnace 10000, and the outlet 12000 may be provided on one side to be adjacent to a lower end of the furnace 10000.

Raw materials for manufacturing mineral fibers may be inserted in the furnace 10000 via the inlet 11000.

Here, the raw materials may include coal briquet and cokes.

The coal briquet may be produced by mixing and pressurizing coal ashes, dolomite (CaMg $(Co_3)_2$) and limestone.

In detail, the coal ashes refer to residual ashes after burning coal in a thermoelectric power plant and the like, and may be classified based on sizes of particles of the coal ashes and thereby maintained.

The dolomite CaMg $(Co_3)_2$ includes barytocalcite in which calcium carbonate and magnesium carbonate are mixed at a 1:1 ratio, and indicates a rhombus crystal, and a crystal face is slightly curved. Further, the dolomite has a gradient of 3.5 to 4, has a weight of 2.8 to 2.9, and has a complete split in a rhombus direction.

The limestone generally refers to fine-grained and bulky apedal rock. An appearance color of limestone may be white or gray in color. Here, impurities may be dark gray or black in color.

The aforementioned coal ashes, dolomite and limestone may be transported and stored based on a unit of a particle size having a predetermined range in order to be uniformly mixed. In this instance, a plurality of measuring devices may be provided in a storage of coal ashes, dolomite and limestone.

Even though not illustrated in detail, a coal briquet manufacturer (not shown) for manufacturing coal briquet may be provided. Coal ashes, dolomite and limestone may be concurrently fed internally to the coal briquet manufacturer at a predetermined mixture ratio. In this instance, the predetermined quantity of special binding materials may also be inserted in the coal briquet manufacturer.

Also, the mixture ratio may be selectively adjusted as necessary, and a mixture ratio between each raw material and the special binding material may also be variably applied.

The coal briquet manufacturer may manufacture the coal briquet in a solid fuel type by compressing the mixture of coal ashes, dolomite, limestone, and the special binding materials.

The manufactured coal briquet may be transported to a coal briquet storage through a conveyor and be stored therein.

The coal briquet stored in the coal briquet storage may be inserted in a quantitative feeder through a conveyor.

Here, cokes being stored in a cokes storage may also be inserted in the quantitative feeder through the conveyor.

An appearance of cokes may be black with gray shading and also has a metallic gloss. The cokes includes fixed carbon as a primary component and contains trace amounts of ash content and volatile matter. In terms of technical analysis values, the cokes generally includes 80 to 94% fixed carbon, 6 to 18% ash content, and 0.5 to 2% volatile matter. In terms of elementary analysis values, the cokes includes 80 to 92% carbon, 1 to 1.5% hydrogen, 0.5 to 0.9% nitrite, 0.4 to 0.7% oxygen, 0.5 to 1% sulfur, and 6 to 18% ash content.

Also, cokes has a caloric power of 6000 to 7500 kilocalories (kcal) per 1 kilogram (kg), and has an ignition temperature of 400 to 600° C.

The cokes may be additionally fed in order to melt the coal briquet.

Each of the quantitative coal briquet and cokes may be inserted from the quantitative feeder in the furnace 10000 through the inlet 11000 of the furnace 10000 through a conveyor.

While the raw materials for manufacturing mineral fibers, that is, coal briquet and cokes fed through the inlet 11000 of the furnace 10000 are going through a process of a preheating zone, a reducing zone, a combusting zone, and a melting zone, organic compounds of mineral fibers contained in the coal briquet may be melted.

Here, a controller may control the quantity of air and oxygen to be inserted in order to sufficiently excessively supply oxygen in the reducing zone and thereby increase the combustion efficiency.

The controller may control an inside temperature and an exhaust temperature of the furnace 10000, so that the inside temperature of the furnace 10000 is maintained at the temperature of about 1500° C., and the exhaust temperature of the furnace 10000 is maintained at the temperature of about 300 to 500° C.

Here, the inside temperature of the furnace 10000 may reach a high temperature enough to melt coal briquet and cokes.

Accordingly, an outside iron plate of the furnace 10000 and refractory built inside the furnace 10000 may be designed to have a sufficient thickness to be capable of enduring a high temperature inside the furnace 10000. Depending on necessity, a variety of cooling methods may be employed.

Further, the controller may control a melting rate within the furnace 10000, the quantity of raw materials to be inserted through the inlet 11000 of the furnace 10000, and the like.

Through the aforementioned process, the inserted materials may be discharged in a melted state through the outlet 12000 of the furnace 10000.

Also, the first exhaust opening 13000 may be provided in an upper portion of the furnace 10000.

Exhaust gas produced while coal briquet and cokes are being combusted within the furnace 10000 may be discharged through the first exhaust opening 13000.

Here, exhaust gas discharged through the first exhaust opening 13000 may be at the temperature of about 400 to 500° C. The exhaust gas may include gas and impurities.

A gas pipe 14000 may be connected to the first exhaust opening 13000. A flow path of exhaust gas may be formed within the gas pipe 14000.

One end of the gas pipe 14000 may be connected to the first exhaust opening 13000 and another end of the gas pipe 14000 may be connected to an inflow opening 21000 of the re-combustion chamber 20000.

In detail, the gas pipe 14000 may pass through a heat exchanger 30000 and a fan 40000 and thereby be connected from the first exhaust opening 13000 to the inflow opening 21000 of the re-combustion chamber 20000.

Also, the gas pipe 14000 may be downwardly disposed in the heat exchanger 30000 and may be upwardly disposed in the fan 40000.

Here, the heat exchanger 30000 may increase or decrease a temperature of exhaust gas, and the fan 40000 may guide a flow of exhaust gas so that the exhaust gas may reach the re-combustion chamber 20000.

The re-combustion chamber 20000 may be connected to the gas pipe 14000.

An upper end of the re-combustion chamber 20000 may be provided in an arch shape, thereby further stabilizing a structure of the re-combustion chamber 20000.

Also, the re-combustion chamber 20000 may include the inflow opening 21000 through which the exhaust gas discharged from the furnace 10000 flows in and a second exhaust opening 22000 through which the exhaust gas is externally dischargeable.

The inflow opening 21000 may be formed to penetrate a lower end of the re-combustion chamber 20000. The exhaust gas flowed in through the inflow opening 21000 may move upwards within the re-combustion chamber 20000.

The second exhaust opening 22000 may be formed to penetrate an upper side of the re-combustion chamber 20000.

For example, referring to FIG. 9, when the inflow opening 21000 is provided to be adjacent to the left of the re-combustion chamber 20000, the second exhaust opening 22000 may be provided on an upper right side of the re-combustion chamber 20000.

Exhaust gas within the re-combustion chamber 20000 may be externally dischargeable through the second exhaust opening 22000.

The aforementioned first exhaust opening 13000 and second exhaust opening 22000 are commonly configured to externally discharge exhaust gas from a predetermined space.

Here, a biggest difference between the exhaust gas discharged from the first exhaust opening 13000 and the exhaust gas discharged from the second exhaust opening 22000 is whether impurities are present in the exhaust gas.

That is, impurities may be present in the exhaust gas discharged from the first exhaust opening 13000, whereas impurities may be absent in the exhaust gas discharged from the second exhaust opening 22000.

Also, a heat source 23000 may be provided on one side of the re-combustion chamber 20000.

For example, a burner may be provided as the heat source 23000. The heat source 23000 may supply a heat toward an inside of the re-combustion chamber 20000.

Here, the heat source 23000 may be provided on a side that faces a side on which the second exhaust opening 22000 is provided.

Also, a heat accumulator 24000 may be disposed to be adjacent to the heat source 230 within the re-combustion chamber 20000.

In particular, the heat accumulator 24000 may be disposed on the inflow opening 21000 of the re-combustion chamber 20000.

Referring to FIG. 10, the heat accumulator 24000 may be provided in a form in which a plurality of bricks is stacked.

The plurality of bricks may be provided in a variety of shapes including a rectangular shape, a cylindrical shape, and a triangular prism shape.

Also, the plurality of bricks may be stacked to form an air gap 24200 within the heat accumulator 24000.

For example, since the air gap 24200 is formed between the plurality of bricks, exhaust gas flowed in through the inflow opening 21000 may be guided through the air gap 24200.

That is, the air gap 24200 may communicate with the inflow opening 21000.

The shape and arrangement of the plurality of bricks constituting the heat accumulator 24000 are not limited to the example of FIG. 10 and thus, any shape that allows exhaust gas to pass through the heat accumulator 24000 may be employed.

The heat accumulator 24000 may accumulate heat supplied from the heat source 23000.

In detail, the heat accumulator 24000 may be preheated prior to exhaust gas flowing in the re-combustion chamber 20000 or through the inflow opening 21000. Here, the heat accumulator 24000 may be preheated at the temperature of, for example, 700 to 800° C. by the heat source 23000.

Accordingly, the heat accumulator 24000 may need to be formed using a material sufficient to endure the heat supplied from the heat source 23000.

Also, while exhaust gas flows in the re-combustion chamber 20000 or through the inflow opening 21000 and passes through the accumulator 24000, the heat accumulator 24000 may be continuously heated by the heat source 23000. Accordingly, the heat accumulator 24000 may be maintained at a high temperature.

Such an interaction between the heat source 23000 and the heat accumulator 24000 may perfectly combust exhaust gas or impurities within the exhaust gas, thereby helping to remove the impurities within the exhaust gas.

In addition, when transporting the exhaust gas through the air gap 24200 of the heat accumulator 24000, it is possible to extend a stay time of exhaust gas within the heat accumulator 24000. Accordingly, the impurities within the exhaust gas may be sufficiently combusted.

As the impurities within the exhaust gas is perfectly combusted in the heat accumulator 24000, combustion residues such as ashes may be produced.

A preventer 25000 may be disposed within the re-combustion chamber 20000 to remove the combustion residues of impurities within the exhaust gas.

The preventer 25000 may include a plurality of dams.

For example, the preventer 25000 may include a first dam 25200 and a second dam 25400.

The first dam 25200 may be disposed to be adjacent to the heat accumulator 24000 and to partition an inner space of the re-combustion chamber 20000.

Referring to FIG. 11, the first dam 25200 may be formed to correspond to a shape of a cross-section of the re-combustion chamber 20000. An upper end of the first dam 25200 may also be provided in an arch shape, which is similar to the upper end of the re-combustion chamber 20000.

Also, a first via-hole 25220 may be formed on an upper center of the first dam 25200.

An upper end of the first via-hole 25220 may be provided in an arch shape.

Exhaust gas having passed through the inflow opening 21000 and the heat accumulator 24000 may pass through the first via-hole 25220.

During the above process, combustion residues of impurities within exhaust gas may fall down toward a bottom of the re-combustion chamber 20000. This phenomenon may occur since the exhaust gas encounters resistance while passing through the first via-hole 25220.

The second dam 25400 may be disposed at a location separate from the first dam 25200 and toward the second exhaust opening 22000.

Similar to the first dam 25200, the second dam 25400 may partition the inner space of the re-combustion chamber 20000. The inner space of the re-combustion chamber 20000 may be partitioned into three spaces by the first dam 25200 and the second dam 25400.

Referring to FIG. 12, the second dam 25400 may be formed to correspond to the shape of the cross-section of the re-combustion chamber 20000. An upper end of the second dam 25400 may also be provided in an arch shape, which is similar to the upper end of the re-combustion chamber 20000.

Also, a second via-hole 25420 may be formed on a lower center of the second dam 25400.

An upper end of the second via-hole 25420 may be provided in an arch shape.

Exhaust gas having passed through the inflow opening 21000, the heat accumulator 24000, and the first via-hole 25220 may pass through the second via-hole 25420.

During the above process, combustion residues of impurities within exhaust gas may fall down toward the bottom of the re-combustion chamber 20000. This phenomenon may occur since the exhaust gas encounters resistance while passing through the second via-hole 25420.

Also, a hopper 26000 may be provided between the first dam 25200 and the second dam 25400.

The hopper 26000 enables combustion residues of impurities within exhaust gas to be externally discharged through the bottom of the re-combustion chamber 20000.

Here, the hopper 26000 is disposed between the first dam 25200 and the second dam 25400 since a relatively large amount of combustion residues of impurities within exhaust gas is discharged while passing through the first via-hole 25220 and then passing through the second via-hole 25420.

Exhaust gas having passed through the second via-hole 25420 formed on the second dam 254 may be transported toward the second exhaust opening 22000 and then externally discharged from the re-combustion chamber 20000.

Also, a transport path of exhaust gas flowed in the re-combustion chamber 20000 may vary due to the first dam 25200 and the second dam 25400.

In detail, a first flow path Q1, a second flow path Q2, and a third flow path Q3 may be formed within the re-combustion chamber 20000.

The first flow path Q1 may extend from the inflow opening 21000 toward the first via-hole 25220 of the first dam 25200.

Here, the inflow opening 21000 may be provided in a lower portion of the re-combustion chamber 20000 and the first via-hole 25220 may be provided on a top of the first dam 25200, whereby the exhaust gas may move upwards along the first flow path Q1.

In particular, a portion of the first flow path Q1 may be formed within the heat accumulator 24000.

That is, a portion of the first flow path Q1 may be formed to pass through the heat accumulator 24000 from a lower portion to an upper portion of the heat accumulator 24000.

The second flow path Q2 may extend from the first via-hole 25220 of the first dam 25200 toward the second via-hole 25420 of the second dam 25400.

Here, the first via-hole 25220 may be provided on the top of the first dam 25200 and the second via-hole 25420 may be provided on the bottom of the second dam 25400, whereby the exhaust gas may move downwards along the second flow path Q2.

The third flow path Q3 may extend from the second via-hole 25420 of the second dam 25400 toward the second exhaust opening 22000.

Here, the second via-hole 25420 may be provided on the bottom of the second dam 25400 and the second exhaust opening 22000 may be provided on the upper side of the re-combustion chamber 20000, whereby the exhaust gas may move upwards along the third flow path Q3.

Based on the first flow path Q1, the second flow path Q2, and the third flow path Q3, the first dam 25200 may be disposed between the first flow path Q1 and the second flow path Q2, and the second dam 25400 may be disposed between the second flow path Q2 and the third flow path Q3.

As described above, exhaust gas may be transported from the first flow path Q1 to the second flow path Q2 by way of the first dam 25200, and may be transported from the second flow path Q2 to the third flow path Q3 by way of the second dam 25400.

Accordingly, a re-combustion apparatus and a mineral fiber manufacturing apparatus including the re-combustion apparatus according to embodiments may change a flow path of exhaust gas within a re-combustion chamber and may efficiently remove combustion residues of impurities within the exhaust gas by providing dual dams within the re-combustion chamber.

Also, by re-combusting or perfectly combusting exhaust gas discharged from a furnace, it is possible to remove impurities within the exhaust gas, and to prevent the air pollution by the exhaust gas. In addition, it is possible to sufficiently re-combust or perfectly combust the exhaust gas within a heat accumulator by extending a stay time of the exhaust gas within the heat accumulator. Further, since a heat source is provided to be adjacent to the heat accumulator, an inside temperature of the heat accumulator may be maintained at a high temperature before the exhaust gas flows in the heat accumulator or while the exhaust gas passes through the heat accumulator.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:
1. A mineral fiber manufacturing apparatus comprising:
 a furnace comprising an inlet through which coal briquette and cokes for manufacturing mineral fibers are inserted, a first exhaust gas outlet through which exhaust gas by combustion of the cokes is discharged, and a molten metal outlet through which a molten metal in which the coal briquette is melted is discharged;
 a heat exchanger disposed to be separate from one side of the furnace and in which the exhaust gas discharged through the first exhaust gas outlet flows,
  wherein the heat exchanger comprises:
   an exhaust gas inlet provided at an upper end of the heat exchanger and through which the exhaust gas discharged through the first exhaust gas outlet flows in the heat exchanger;
   an exhaust gas passage downwardly extending from the upper end of the heat exchanger toward a lower end of the heat exchanger, and configured to provide a travel route of the exhaust gas flowing through the exhaust gas inlet; and
   a second exhaust gas outlet provided at the lower end of the heat exchanger, and through which the exhaust gas having passed through the exhaust gas passage is discharged,
   a combustion air inlet disposed adjacent to the second exhaust gas outlet, and through which the air discharged from the blower flows in the heat exchanger;
   a combustion air passage configured to provide a travel route of the air flowing through the combustion air inlet, wherein the combustion air passage is provided to wrap around the outer peripheral surface of the exhaust gas passage in a spiral form, and the heat of the exhaust gas flowing within the exhaust gas passage is transferred to the air flowing within the combustion air passage; and
   a combustion air outlet disposed adjacent to the exhaust gas inlet, and configured to discharge the air having passed through the combustion air passage,
  wherein the heat exchanger is configured to provide that the temperature of the exhaust gas discharged from the second exhaust gas outlet is lower than the temperature of the exhaust gas flowing into the exhaust gas inlet,
  wherein the heat exchanger is configured to provide that the temperature of the air discharged from the combustion air outlet is greater than the temperature of the air flowing through the combustion air inlet; and
 a blower disposed in a lower portion of the furnace or between the furnace and the heat exchanger, and configured to supply the heat exchanger with air having a temperature lower than a temperature of the exhaust gas, wherein the air discharged from the blower is heated by the exhaust gas flowing in the heat exchanger, and is discharged to an inside of the furnace to combust the cokes, wherein the furnace further comprises a plurality of water jackets configured to wrap around the outer peripheral surface of the furnace and to transfer heat generated from the furnace, wherein the plurality of water jackets comprises:
   a first water jacket; and
   a second water jacket upwardly separated from the first water jacket along a lengthwise direction of the furnace,
   wherein one of the first water jacket and the second water jacket is connected to a pump, and the other of the first water jacket and the second water jacket is connected to a water tank, wherein the plurality of water jackets, the water tank, and the pump are connected by a plurality of flow paths, wherein the plurality of flow paths comprises:
   a first flow path through which water within the water tank is transported to the pump;
   a second flow path extending along the lengthwise direction of the furnace, and through which water discharged from the pump is transported to the first water jacket;
   a third flow path extending alongside the outer peripheral surface of the furnace, and through which water discharged from the first water jacket is transported upwardly to the second water jacket; and
   a fourth flow path through which water discharged from the second water jacket is transported downwardly to the water tank, wherein the third flow path includes a plurality of third flow paths such that cooling water supplied to the first water jacket is fed to the second water jacket at a plurality of points of the first water jacket, and wherein the first water jacket and the second water jacket are configured such that heat transferred from an inner wall of the furnace to an outer wall of the furnace is cooled by cooling water circulating through the first water jacket and the second water jacket.

2. The mineral fiber manufacturing apparatus of claim 1, wherein the furnace further comprises a combustion air supply line, and the combustion air supply line comprises:
   a first supply line provided in a ring shape and configured to wrap around the outer peripheral surface of the furnace; and
   a second supply line downwardly extending from the first supply line and then extending toward an inner space of the furnace by passing through one side of the furnace,
   wherein air discharged from the combustion air outlet flows in the first supply line.

3. The mineral fiber manufacturing apparatus of claim 2, wherein the combustion air outlet is disposed above the first supply line and the second supply line, and the combustion air inlet is disposed between the first supply line and the second supply line.

4. The mineral fiber manufacturing apparatus of claim 1, further comprising:
   a re-combustor configured to completely combust the exhaust gas discharged through the first exhaust gas outlet and having passed through the heat exchanger; and
   a mineral fiber manufacturer configured to manufacture mineral fibers from the a molten metal discharged through the molten metal outlet.

* * * * *